(12) United States Patent
Scharff et al.

(10) Patent No.: US 8,823,685 B2
(45) Date of Patent: Sep. 2, 2014

(54) ACOUSTIC TOUCH APPARATUS

(75) Inventors: Daniel H. Scharff, San Leandro, CA (US); James L. Aroyan, Soquel, CA (US); Ting Gao, Sunnyvale, CA (US); Joel C. Kent, Fremont, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 29 days.

(21) Appl. No.: 13/274,236

(22) Filed: Oct. 14, 2011

(65) Prior Publication Data

US 2013/0093731 A1  Apr. 18, 2013

(51) Int. Cl.
*G06F 3/041* (2006.01)

(52) U.S. Cl.
USPC ........................................ 345/177; 345/173

(58) Field of Classification Search
None
See application file for complete search history.

(56) References Cited

U.S. PATENT DOCUMENTS

| | | | |
|---|---|---|---|
| 6,091,406 A | 7/2000 | Kambara et al. |
| 6,225,985 B1 | 5/2001 | Armstrong et al. |
| 6,506,171 B1 | 1/2003 | Vitek et al. |
| 6,567,077 B2 | 5/2003 | Inoue et al. |
| 7,274,358 B2 | 9/2007 | Kent |
| 2002/0005838 A1 | 1/2002 | Inoue |
| 2004/0178999 A1 | 9/2004 | Cheng et al. |
| 2010/0013783 A1 | 1/2010 | St. Pierre |
| 2010/0117993 A1 | 5/2010 | Kent |
| 2011/0234545 A1 | 9/2011 | Tanaka et al. |

FOREIGN PATENT DOCUMENTS

GB  2034039 A  5/1980

OTHER PUBLICATIONS

United States Office Action for U.S. Appl. No. 13/274,173, dated Jun. 10, 2013.
International Search Report and Written Opinion for Application No. PCT/US2012/060272, dated Feb. 4, 2013.
Extended European Search Report for Application No. 12188142.9, dated Jun. 6, 2013.

*Primary Examiner* — Van Chow
(74) *Attorney, Agent, or Firm* — Alston & Bird LLP

(57) ABSTRACT

Acoustic touch apparatus comprising a substrate having first and second surfaces capable of propagating surface acoustic waves, the second surface comprising a touch region and the first and second surfaces coupled via a rounded connecting surface; at least one acoustic wave transducer on the first surface; and at least one reflective array on the first surface. The transducer is capable of transmitting or receiving waves to and from the reflective array. The substrate and reflective array can acoustically couple waves between the first and second surfaces. The substrate has a border region on the first surface adapted to hide the transducer and reflective array and preclude distortion of waves propagating over a window in the border region. The border region may have a border layer except at the window and a corrective lens is used proximate the window, or the border region comprises discolored glass except at the window.

20 Claims, 18 Drawing Sheets

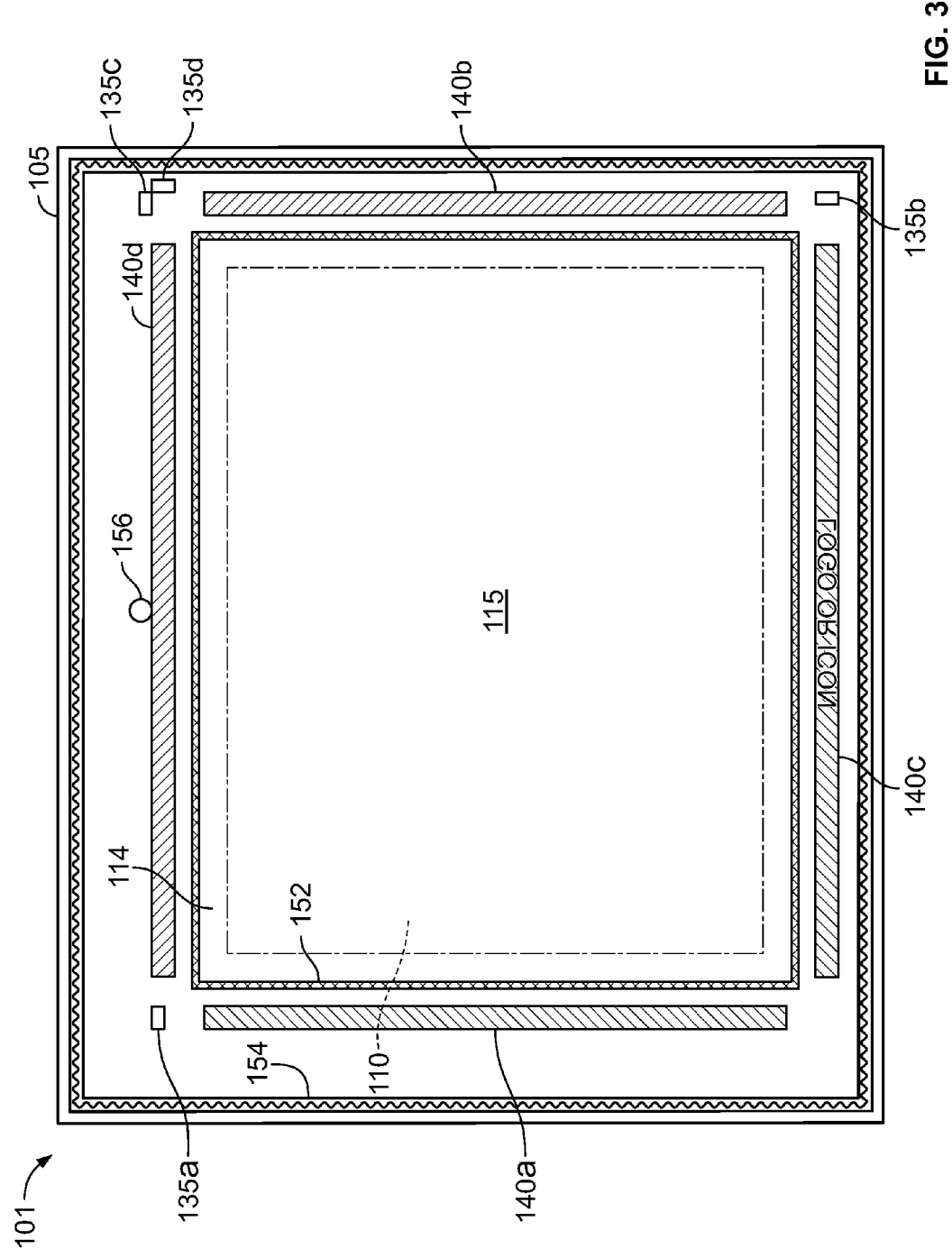

ACOUSTIC TOUCH APPARATUS

FIELD OF THE INVENTION

This invention generally relates to acoustic touch sensors and, more particularly, to surface acoustic wave (SAW) touchscreens.

BACKGROUND OF THE INVENTION

Touch sensor systems, such as touchscreens or touch monitors, can act as input devices for interactive computer systems used for various applications, for example, information kiosks, order entry systems, video displays, mobile communications, etc. Such systems may be integrated into a computing device, thus providing interactive touch capable computing devices, including computers, electronic book readers, or mobile communications devices.

Generally, touch sensor systems enable the determination of a position on the surface of a substrate via a user's touch of the surface. The touch substrate is typically made of some form of glass which overlies a computer or computing device display, like a liquid crystal display (LCD), an organic light emitting diode (OLED) display, plasma display, etc. The touch sensor system is operatively connected to the device display so as to enable the determination of a position on the device display and, moreover, of the appropriate control action of a user interface such as shown on the display.

Touch sensor systems may be implemented using different technologies. Acoustic touch sensors, such as ultrasonic touch sensors using surface acoustic waves, are currently one of the dominant touch sensor technologies and different types of acoustic touch sensors now exist. For example, an "Adler-type" acoustic touch sensor uses only two transducers per coordinate axis to spatially spread a transmitted surface acoustic wave signal and determines the touch surface coordinates by analyzing temporal aspects of a wave perturbation from a touch. For each axis, one transducer at a respective peripheral surface generates surface acoustic wave pulses that propagate through the substrate along a perpendicular peripheral surface along which a first reflective grating or array is disposed. The first reflective array is adapted to reflect portions of a surface acoustic wave perpendicularly across the substrate along plural parallel paths to a second reflective array disposed on the opposite peripheral surface. The second reflective array reflects the surface acoustic wave along the peripheral surface to a second transducer where the wave is received for processing. The reflective arrays associated with the X axis are perpendicular to the reflective arrays associated with the Y axis so as to provide a grid pattern to enable two-dimensional coordinates of a touch on the substrate to be determined. Touching the substrate surface at a point causes a loss of energy by the surface acoustic waves passing through the point of touch. This is manifested as an attenuation of the surface acoustic waves and is detected by the receiving transducers as a perturbation in the surface acoustic wave signal. A time delay analysis of the data is used to determine the surface coordinates of a touch on the substrate.

An acoustic touch sensor may have a large number of operative elements (either multiple transducers, or transducer and reflective array combinations) disposed on, and along, the front peripheral surfaces of the substrate. In order to prevent damage due to exposure from the environment or external objects, the housing for these sensors or for the devices integrating a sensor may include a bezel for the front peripheral surfaces of the touch substrate that hides and protects these peripheral operative elements, so that only an active touch region on the front surface of the substrate is exposed for possible touch input. For bezel-less acoustic touch sensors, the peripheral operative elements may be located on the back peripheral surfaces of the substrate (in this case, a surface acoustic wave propagates around a substrate edge, across the front surface, and around the opposite substrate edge to reach the receiving elements). Thin-width bezel and bezel-less acoustic touch sensors each seek to maximize the active touch region, which may be beneficial for small-sized integrated devices, like a smartphone, a tablet computer, an electronic book reader, or other mobile computing device.

As the active touch region enlarges, more device features and touch functions may be provided in the active touch region. In some cases, however, these additional features and functions may interfere with the propagation of surface acoustic waves on the touch substrate. For example, in many bezel-less systems that have certain aesthetic considerations, the periphery of the back surface of the substrate may have a generally acoustically benign layer ("border layer"), which may be an opaque layer of paint or ink applied on a border region of the surface, with the peripheral operative elements being bonded or printed on top of the "border layer" so that the elements are hidden from view through the typically transparent substrate.

It may be desired in some applications to provide in the border layer on the border region an area without paint or ink in order to provide a camera window or acoustic hole (i.e., an unobstructed optical path from a camera lens disposed behind the substrate, through the substrate, to the outside of the device) for an integrated camera, which is one of the most desired device features. However, an attenuation or a dip in the surface acoustic wave signal at the receiving transducers may be observed at the location of the camera hole. Further, no touch response may be observed along a narrow band across the active touch region of the substrate centered at the camera hole.

The aforementioned problems are addressed by the present invention according to specific embodiments.

SUMMARY OF THE INVENTION

In accordance with specific embodiments, the invention provides an acoustic touch apparatus comprising a substrate having a first surface and a second surface, the first and second surfaces capable of propagating surface acoustic waves, the second surface comprising a touch region and the first and second surfaces coupled via a rounded connecting surface; at least one acoustic wave transducer on the first surface; and at least one reflective array on the first surface, the transducer capable of transmitting or receiving surface acoustic waves to and from the reflective array. The substrate and the reflective array are capable of acoustically coupling surface acoustic waves to propagate between the first and second surfaces of the substrate, and the substrate has a border region on the first surface that is adapted to hide from view through the substrate the transducer and the reflective array and to preclude distortion of surface acoustic waves propagating over a window in the border region. According to a specific embodiment, the border region comprises a border layer on the first surface and includes an acoustic lens that counteracts a phase shift of surface acoustic waves propagating over the window, the window being an uncoated area in the border layer. According to an alternative specific embodiment, the substrate may comprise transparent glass material and the border region may comprise colored glass material except at the window.

In accordance with another specific embodiment, the present invention also provides a method of providing an acoustic touch apparatus with a window through a border layer on and in a border region of a substrate of the acoustic touch apparatus, the border layer being an acoustic coating. The method includes providing a corrective lens to counteract a phase shift of surface acoustic waves propagating over the window, the window being an uncoated area in the border layer; determining a height of the corrective lens; and specifying a shape of the corrective lens that is physically close to, and has a symmetrical outline relative to, the window.

For a better understanding of the present invention, reference is made to the following description of exemplary embodiments thereof, and to the accompanying drawings.

BRIEF DESCRIPTION OF THE DRAWINGS

FIG. 3 is a back plan view of the substrate of an acoustic touch sensor with a device feature and a logo/icon on the substrate;

DETAILED DESCRIPTION OF SPECIFIC EMBODIMENTS OF THE INVENTION

Figure 1:
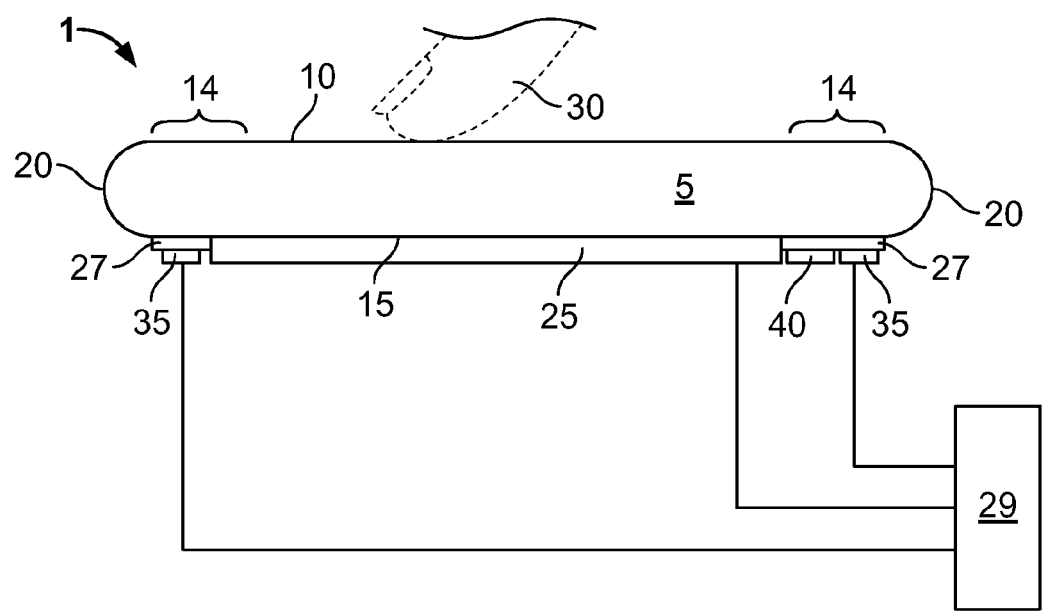
FIG. 1 is a simplified cross-sectional view of an acoustic touch sensor.

FIG. 1 shows a simplified cross-sectional view of an acoustic touch sensor 1 for a touch system that does not require a bezel. The touch sensor 1 comprises a substrate 5 with a front surface 10, a back surface 15, and connecting surfaces 20 joining the peripheral regions 14 of the front surface 10 and of the back surface 15. A connecting surface 20 need not be rounded or curved as shown but may be a straight perpendicular edge in a touch system having a bezel. The substrate 5 is typically made of some form of glass which overlies a computer display or computing device display 25, like a liquid crystal display (LCD), a cathode ray tube (CRT), plasma, etc. In a bezeled surface acoustic wave touch sensor, the peripheral region 14 of the front surface 10 is covered by a bezel provided by the housing of the touch sensor 1 or the device integrating the sensor 1, since the transducers and reflective arrays are on the front surface 10 of the substrate 5. In a bezel-less surface acoustic wave touch sensor, which is shown in the figures, the peripheral region 14 of the front surface 10 is merely the outer/peripheral portion of the front surface 10. Bezel-less surface acoustic wave touch sensors are described in more detail in U.S. patent application Ser. No. 13/012,513, which is herein incorporated by reference. Object 30 is seen in FIG. 1 as a finger, but it is recognized that touches sensed by the surface acoustic waves may include a stylus pressing against the front surface 10 directly or indirectly, through a cover sheet or an anti-reflective coating, depending upon the application of the touch sensor 1. Acoustic transducers 35 and reflective element arrays 40 are provided on a border layer 27 of paint or ink (discussed further below) in the peripheral region 14 of the back surface 15. The transducers 35 are operably coupled to a controller or control system 29 (which may comprise multiple processors such as a dedicated touch system processor and a system processor in some embodiments) that is also operably coupled to the display 25. The controller or control system 29 drives the operation of the transducers 35 and measures the signals from such transducers to determine the touch coordinates, which are then provided to an operating system and software applications to provide the required user interface with the display 25.

Figure 2A:
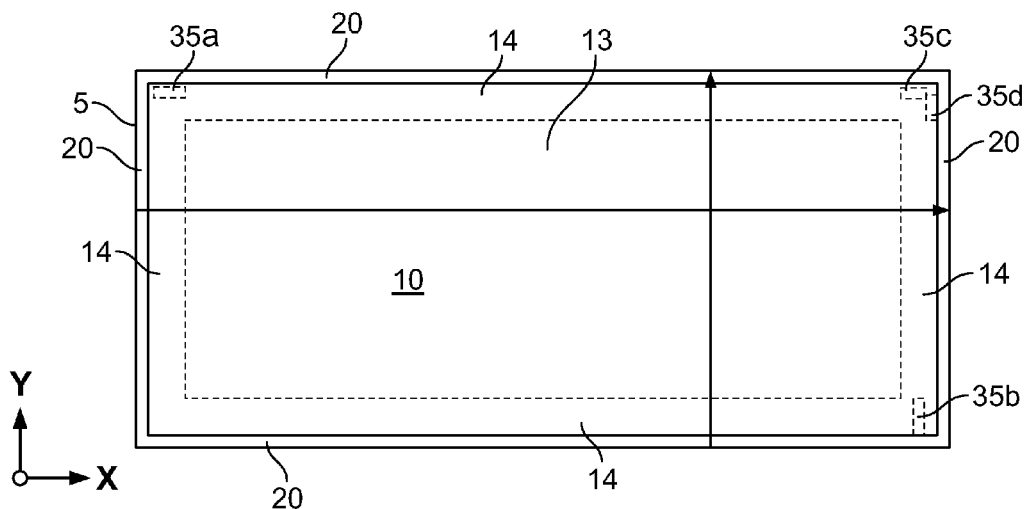
FIGS. 2(a) and 2(b), respectively, are front and back plan views of the substrate of the acoustic touch sensor of FIG. 1.
Figure 2B:
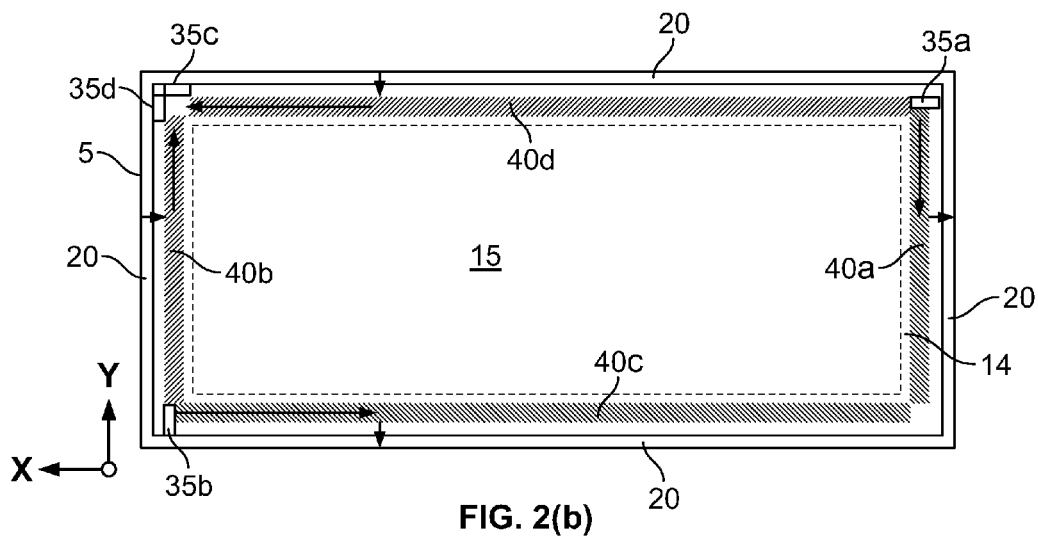

FIGS. 2(a) and 2(b), respectively, are front and back views of the touch substrate 5 shown in FIG. 1. In FIG. 2(a), which is a plan view of the front surface 10, the acoustic transducers 35a, 35b, 35c, 35d are shown in dotted line to provide a frame of reference in relation to FIG. 2(b), which is a plan view of the back surface 15, where the transducers 35a, 35b, 35c, 35d are situated and shown in solid line. Also, the peripheral region 14 is shown in dotted line in FIGS. 2(a) and 2(b). To provide a further frame of reference, X-Y coordinate axes are shown in FIGS. 2(a) and 2(b).

The front surface 10 has an inner portion 13 shown within dotted lines in FIG. 2(a) and an outer/peripheral portion 14 external to the inner portion 13. The inner and outer portions 13, 14 form a nominal touch region on which the object 30 creates a contact to provide input according to the graphical user interface shown on the display 25 (shown in FIG. 1) disposed behind the back surface 15 and visible through the transparent substrate 5. In some bezel-less acoustic touch sensors, the nominal touch region may also comprise the curved connecting surfaces 20 or portions thereof. For a bezeled surface acoustic wave touch sensor, the inner portion 13 not covered by a bezel forms the touch region.

The touch sensor 1 has two pairs of transducers 35 respectively for the X and Y axes that are located in the peripheral region 14 of the back surface 15. The two pairs of transducers 35 are disposed at right angles to define a two-dimensional coordinate system. In particular, a first transmitting transducer 35a is placed in a Y-axis transmitting area and a second transmitting transducer 35b is placed in an X-axis transmitting area. A first receiving transducer 35c is placed in a Y-axis receiving area opposite the Y-axis transmitting area. A second receiving transducer 35d is placed in an X-axis receiving area opposite the X-axis transmitting area. The first transmitting transducer 35a and first receiving transducer 35c are used to measure Y coordinates of touch positions on the front substrate 10, and the second transmitting transducer 35b and second receiving transducer 35d are used to measure X coordinates of touch positions of on the front substrate 10. Each transducer 35 may either transmit or receive a surface acoustic wave, symmetrically. The touch sensor 1 also includes a pair of Y-axis reflective arrays 40a, 40b and a pair of X-axis reflective arrays 40c, 40d that are located in the peripheral region 14 of the back surface 15 in the respective transmitting and receiving areas. The reflective arrays 40 reflect a surface acoustic wave in a desired direction, as described below.

As noted above, the touch sensor 1 is operatively connected with a control system 29 (shown in FIG. 1) for the associated computer or computing device that integrates the sensor 1. The control system 29 generates an electronic signal that excites the transmitting transducers 35a, 35b to generate respective surface acoustic waves (or wave pulses). The control system 29 also receives respective electrical signals transduced by the receiving transducers 35c, 35d from the received surface acoustic waves. The control system 29, as used herein, means electronics typically including a microprocessor with firmware and electronics to generate excitation signals and to receive back and analyze signals from the touch sensor 1.

In operation, the first transmitting transducer 35a generates surface acoustic waves that travel along the negative (−) Y-axis direction of the peripheral region 14 of the back surface 15 on which the first Y-axis reflective array 40a is situated. The elements of the first Y-axis reflective array 40a each transmit part of the surface acoustic waves to an adjacent element of the array 40a. Also, as seen by the solid line arrows indicating the wave propagation path in FIGS. 2(a) and 2(b), the elements of the first Y-axis reflective array 40a each couple or reflect part of the surface acoustic waves to travel a) from the first Y-axis reflective array 40a outwardly along the negative (−) X-axis direction toward and around the proximate curved connecting surface 20; b) along the positive (+) X-axis direction across the front surface 10 toward and around the opposing curved connecting surface 20; and then c) along the negative (−) X-axis direction to the second Y-axis reflective array 40b on the back surface 15. The elements of the second Y-axis reflective array 40b each transmit the received surface acoustic waves to an adjacent element of the array 40b so that the waves continue traveling along the second Y-axis reflective array 40b along the positive (+) Y-axis direction to the first receiving transducer 35c.

Similarly, the second transmitting transducer 35b generates surface acoustic waves that travel along the negative (−) X-axis direction of the peripheral region 14 of the back surface 15 on which the first X-axis reflective array 40c is situated. The elements of the first X-axis reflective array 40c each transmit part of the surface acoustic waves to an adjacent element of the array 40c. Also, as seen by the solid line arrows indicating the wave propagation path in FIGS. 2(a) and 2(b), the elements of the first X-axis reflective array 40c each couple or reflect part of the surface acoustic waves to travel a) from the first X-axis reflective array 40c outwardly along the negative (−) Y-axis direction toward and around the proximate curved connecting surface 20, b) along the positive (+) Y-axis direction across the front surface 10 toward and around the opposing curved connecting surface 20; and then c) along the negative (−) Y-axis direction to the second X-axis reflective array 40d on the back surface 15. The elements of the second X-axis reflective array 40d each transmit the received surface acoustic waves to an adjacent element of the array 40d so that the waves continue traveling along the second X-axis reflective array 40d along the positive (+) X-axis direction to the second receiving transducer 35d.

A touch of the nominal touch region 13, 14 by an object 30, such as finger or stylus, absorbs a portion of the energy of the surface acoustic waves propagating across the front surface 10 and causes an attenuation of the waves passing through the point of touch. The resulting attenuation is detected by the receiving transducers 35c, 35d as a perturbation in the acoustic signal. The control system processes and analyzes the electrical signals transduced by the receiving transducers 35c, 35d, including those related to waveform perturbations, to detect the touch coordinates and position information. Further, the control system maps the touch coordinates and position information to the appropriate control actions of the user interface shown in the display 25 that is generally placed behind the back surface 15. The acoustic touch sensor 1 thus provides an XY coordinate input device system.

FIG. 3 is a plan view of a back surface 115 of a substrate 105 of an acoustic touch sensor 101 that has an exemplary device feature and logo/icon provided on the substrate 105. As noted above, for a bezel-less acoustic touch sensor 101 that has certain aesthetic considerations, an acoustically benign layer ("border layer") 27 such as an opaque paint or ink (shown in FIG. 1) may be applied (e.g., screen printed, painted, sputtered or otherwise applied) on the peripheral region 114, or border, of the back surface 115. The border layer 27 is generally acoustically benign, i.e., it propagates surface acoustic waves without rapid attenuation, preferably resulting in only small changes to the surface acoustic wave's velocity of propagation for easier manufacturing control of the wave's velocity despite factional changes in material thickness. The border layer 27 may be an inorganic black paint made of ceramic frit or porcelain enamel types of material. The periphery functional elements, i.e., the transducers 135 and the reflective arrays 140, are printed on top of the border layer 27 so that the elements are hidden from view through the substrate 105 which is typically transparent. Other periphery elements are also laid on top of the border layer 27 to be hidden from view, e.g., mounting tape 152, sealing foam 154. The border layer 27 is able to both bond with the substrate 105 and serve as an adequate processing surface for the transducers 135 and the reflective arrays 140 formed thereon. Note that the border layer 27 is not shown in FIGS. 3, 4 and 5 so as not to obscure the structures but the border layer 27 covers the peripheral region 114, and may extend at least from the edges of the back surface 115 to just beyond the innermost edge of the mounting tape 152 that is used to adhere the touch sensor to the display.

The peripheral or border region 114 may include an area without a border layer (i.e., a paint-free or ink-free area) to form a window or hole 156, shown disposed between the second X-axis reflective array 140d and the sealing foam 154 and substantially aligned with the centerline of the back surface 115 that is perpendicular to the array 140d. As discussed above, the camera hole 156 is not an actual hole in the substrate 105. Rather, the camera hole 156 forms an optical window or part of an unobstructed optical path that extends from a camera lens (not shown) that is situated behind the back surface 115, through the camera hole 156, the back surface 115; the border layer 27 and the transparent substrate 105, and through a front surface 110 which faces the environment outside the touch sensor 101. The camera lens may be operatively part of a camera that is part of the associated computer or computing device that integrates the sensor 101 and a user interface display 25 (also situated behind the back surface 115).

In the location shown, surface acoustic waves propagating from the front surface 110 pass over the camera hole 156 in layer 27 on back surface 115 before being directed by the second X-axis reflective array 140d to the second receiving transducer 135d. As noted above, it is believed that the lensing effect of the camera hole 156 distorts surface acoustic waves passing over the border layer-free area, resulting in a dip in the received surface acoustic wave signal at the receiving transducers and, in turn, the loss of touch sensitivity in some areas of the touch region.

Figure 4:
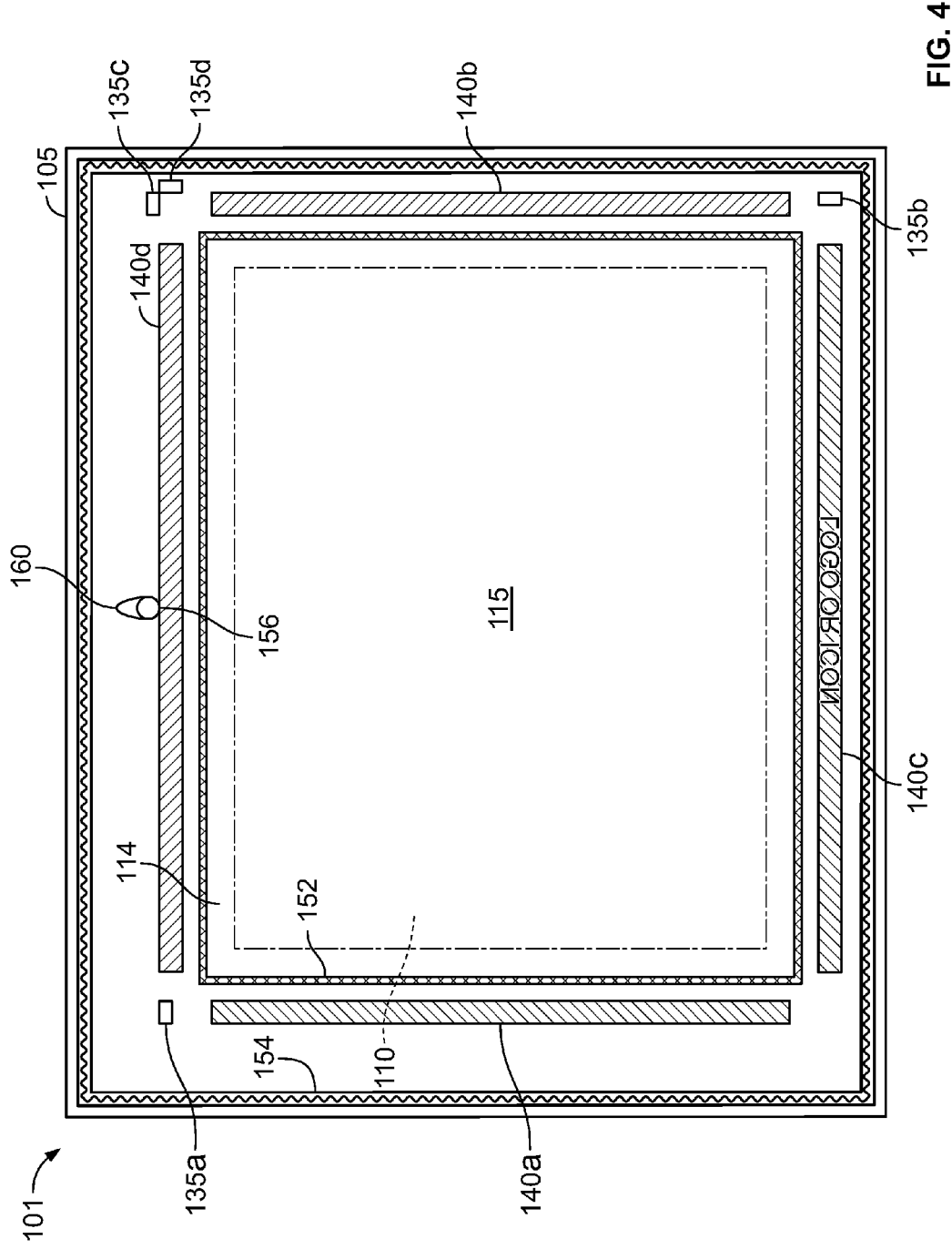
FIG. 4 is a back plan view of the substrate of FIG. 3 constructed in accordance with a specific embodiment of the present invention.

To counteract the distorting effects, a compensating or corrective acoustic lens 160 (shown in FIG. 4) is disposed in the peripheral region 114 of the back surface 115 within the border layer 27. Specifically, the corrective acoustic lens 160 is formed adjacent the camera hole 156 and is shown as a crescent-shaped or meniscus-shaped element in FIG. 4. FIG. 4 is a plan view of the back surface 115 of the substrate 105 constructed in accordance with a specific embodiment of the present invention. Typically, the mechanical properties of border layer materials of practical engineering interest reduce the velocity of propagation of surface acoustic waves (SAW) when the border layer 27 coats a glass surface like the substrate 105. This results in a relatively faster SAW velocity within the camera hole 156 where the substrate 105 is uncoated or bare. The corrective acoustic lens 160 is made with an acoustic material (e.g., glass frit) that when coating the border layer-coated glass substrate 105 further reduces the SAW velocity of propagation relative to the SAW velocity of propagation within the "bare glass" camera hole 156 and relative to the SAW velocity of propagation within the border layer-coated glass substrate 105. The corrective lens 160 is preferably formed on top of the border layer 27 so that the element is hidden from view through the substrate 105, and the lens 160 is positioned, according to a specific embodiment, on the side of the window opposite array 140d so as to avoid compromising the function of array 140d. The corrective lens 160 may be formed or printed in the same operation as the reflector arrays 140 using the same acoustic material. Alternatively the corrective lens 160 can be printed in the same operation as the logo/icon (shown in the figure) using the same material. Further, the corrective lens 160 can be printed in a separate operation using a different material. Note, although the present invention is described herein with respect to the common case of the border layer 27 decreasing the SAW velocity, the present invention may be applied to the case in which the border layer 27 increases SAW velocity.

A series of computer simulations of the effect of a camera hole 356 and of a corrective lens 360 on surface acoustic wave propagation are described and summarized with reference to FIGS. 5 through 15, which plot simulated surface acoustic wave propagations and signal responses thereto. It should be noted that for simplicity the plots of simulated signal responses shown in FIGS. 7, 9, 11, 13 and 15 represent the signal envelope information (rather than showing detailed signals within the envelope). The simulations were conducted using transmitting and receiving X-axis transducers 335b, 335d and first and second X-axis reflective arrays 340c, 340d; a control system routine to collect the signals at the transducers 335; and two different models of the camera hole 356, each with and without a corrective lens 360. In addition, the area of the back surface 315 containing the wave perturbations corresponding to the camera hole 356 was enlarged to allow modeling of the corrective lens 360.

Figure 5:
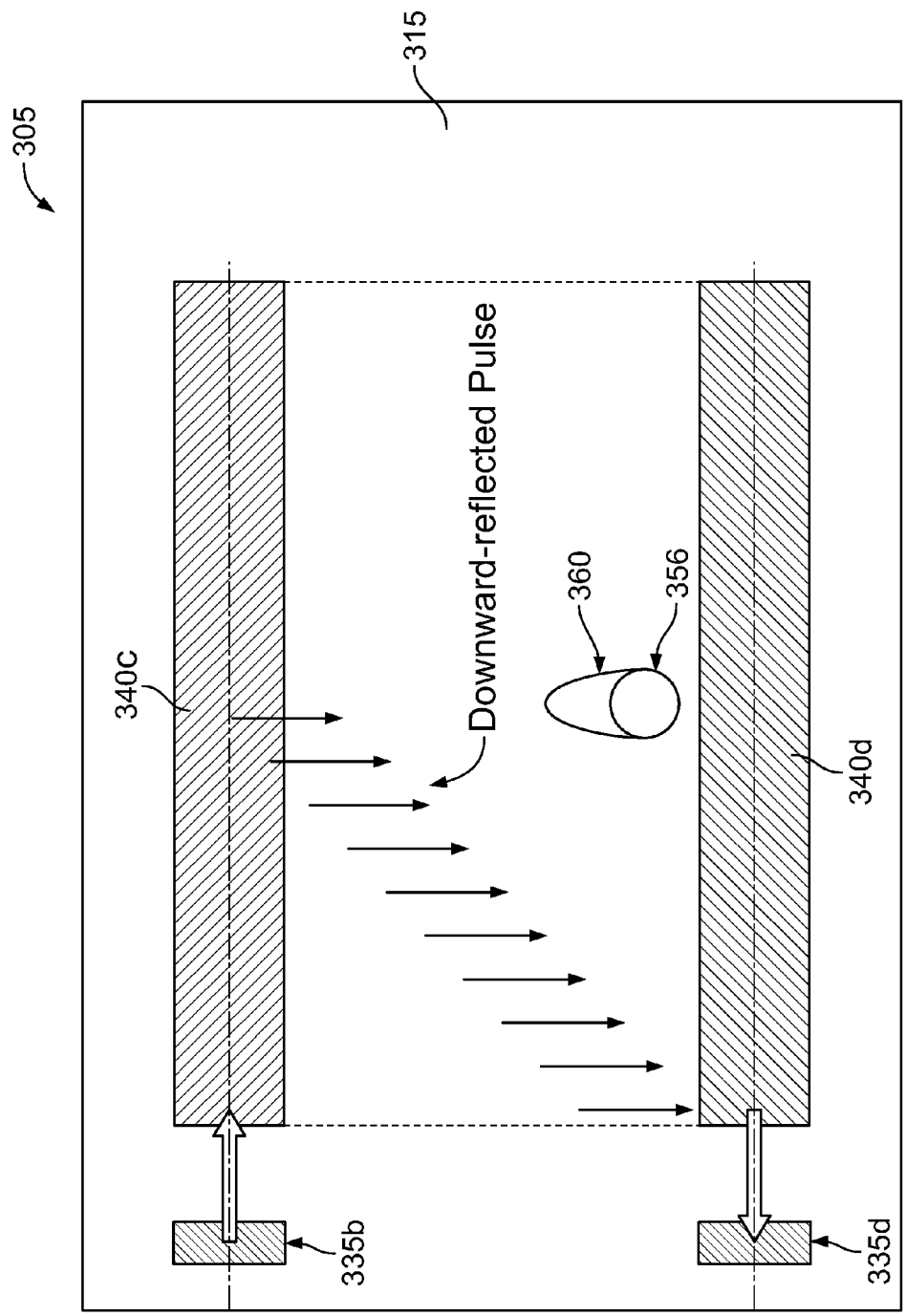
FIG. 5 is a basic layout of a substrate of an acoustic touch sensor in a simulation series.

FIG. 5 illustrates a basic grid layout of the surface 315 of the substrate 305 (i.e., Schott B270™ glass) in the simulation series. The models of the camera hole 356 and the corrective lens 360 are positioned immediately above the midpoint of the second X-axis reflective array 340d. The border layer 27, although not shown, is understood to be on surface 315 to underlie the X-axis reflective arrays 340 and the corrective lens 360 and surround the camera hole 356. The velocities of propagation of the border layer and of the camera hole 356 model were set to the values of 3010 m/s and 3048 m/s, respectively, representing mild wave perturbations. Note that the surface acoustic waves generated by the transmitting X-axis transducer 335b are reflected downward by the first X-axis reflective array 340c and then reflected by the second X-axis reflective array 340d to the receiving X-axis transducer 335d. Comparing FIG. 5 to FIGS. 3 and 4, it is evident that a number of simplifications have been made to render the simulation calculations more manageable. The reflector arrays shown in FIG. 5 are not configured so that the SAW signals do not travel around the edges of substrate 305 for a bezel-less touch sensor (such as shown in FIG. 1) but are configured to propagate across surface 315. Nevertheless, the simulation model of FIG. 5 is sufficient to demonstrate key principles of the corrective lens 360 and the present invention.

Figure 6:
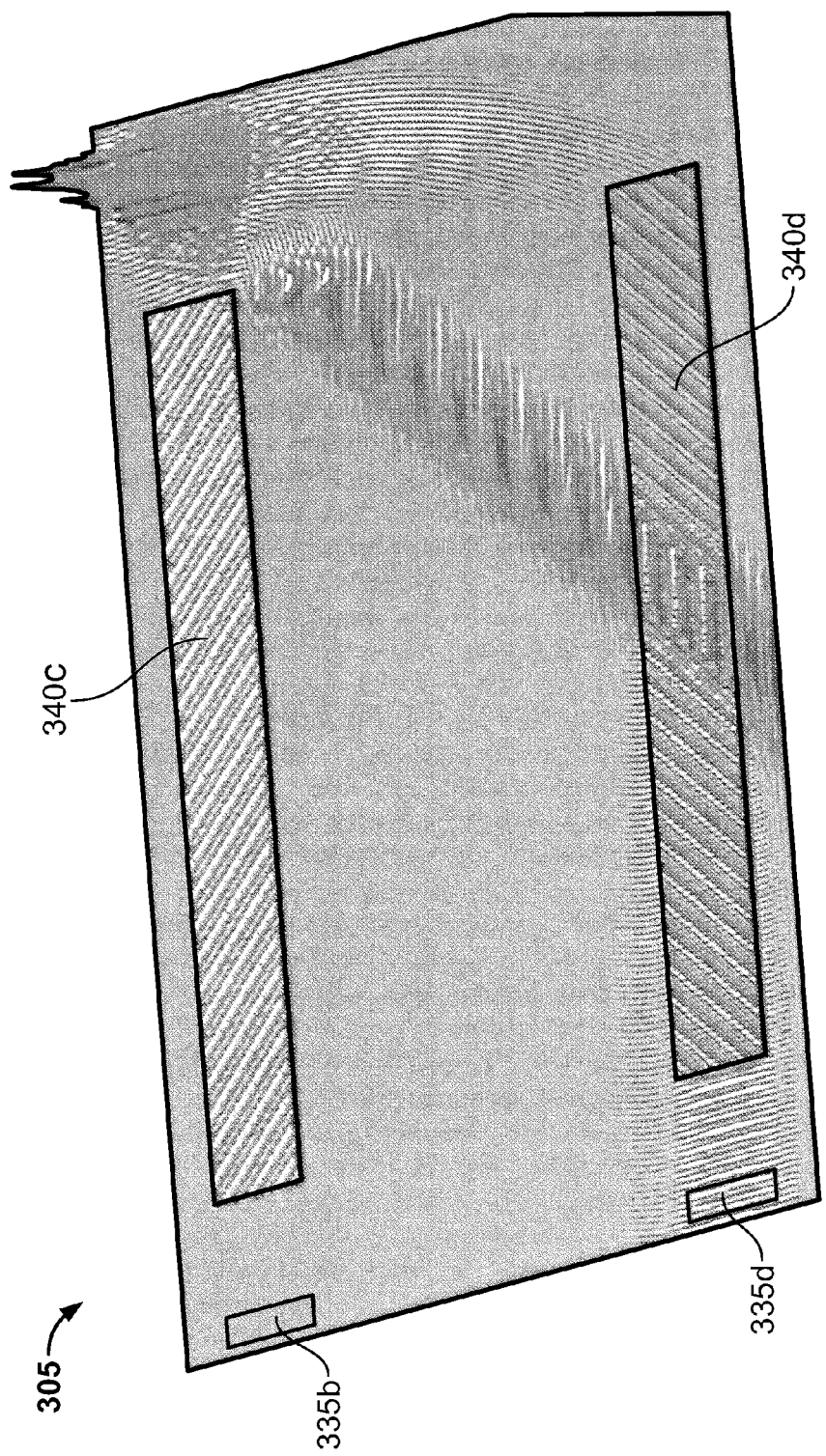
FIG. 6 is a plot of the surface acoustic wave amplitudes on the substrate of FIG. 5 for a baseline simulation.
Figure 7:
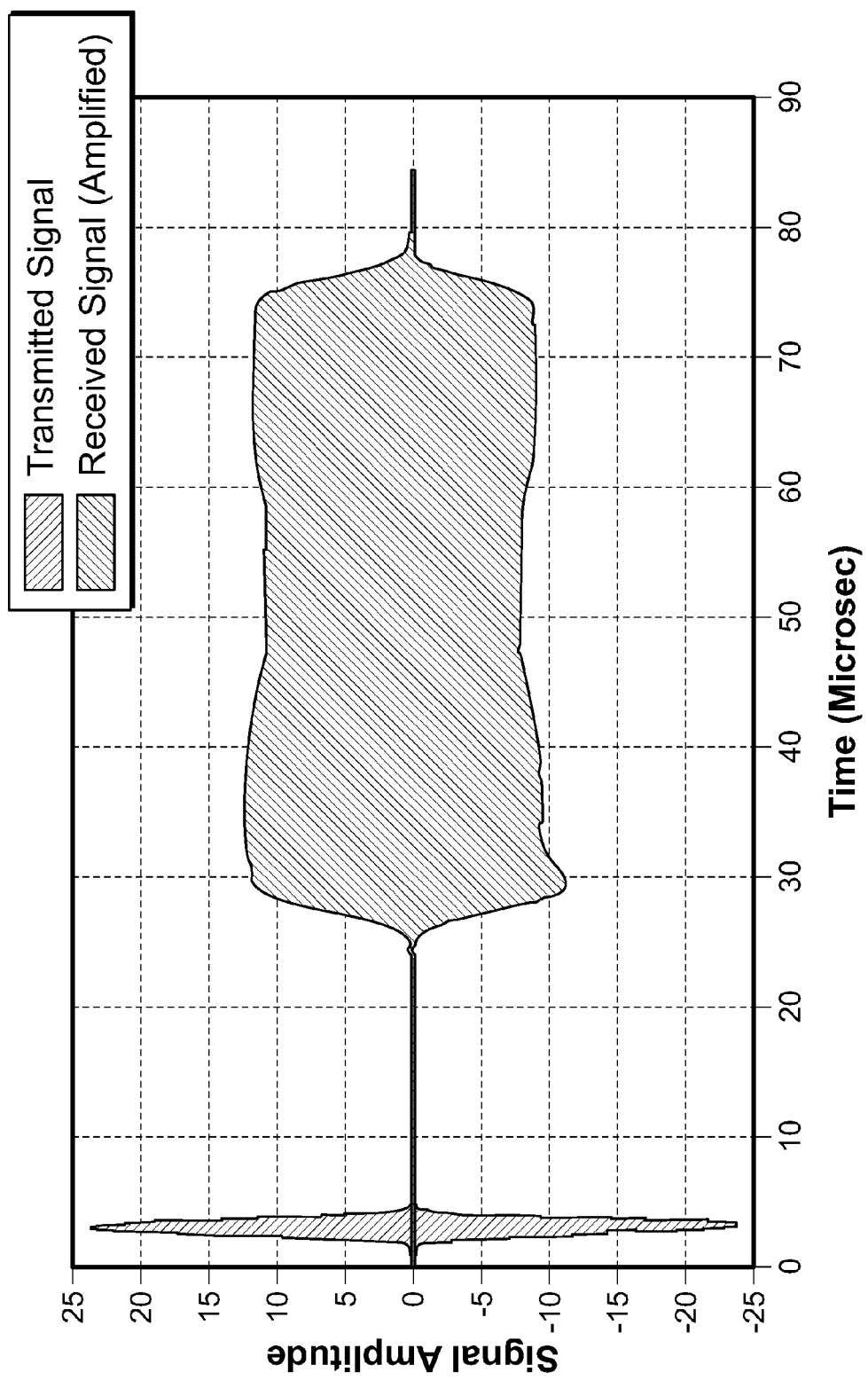
FIG. 7 is a plot of the transmitted and received signals at the transducers for the baseline simulation of FIG. 6.
Figure 8:
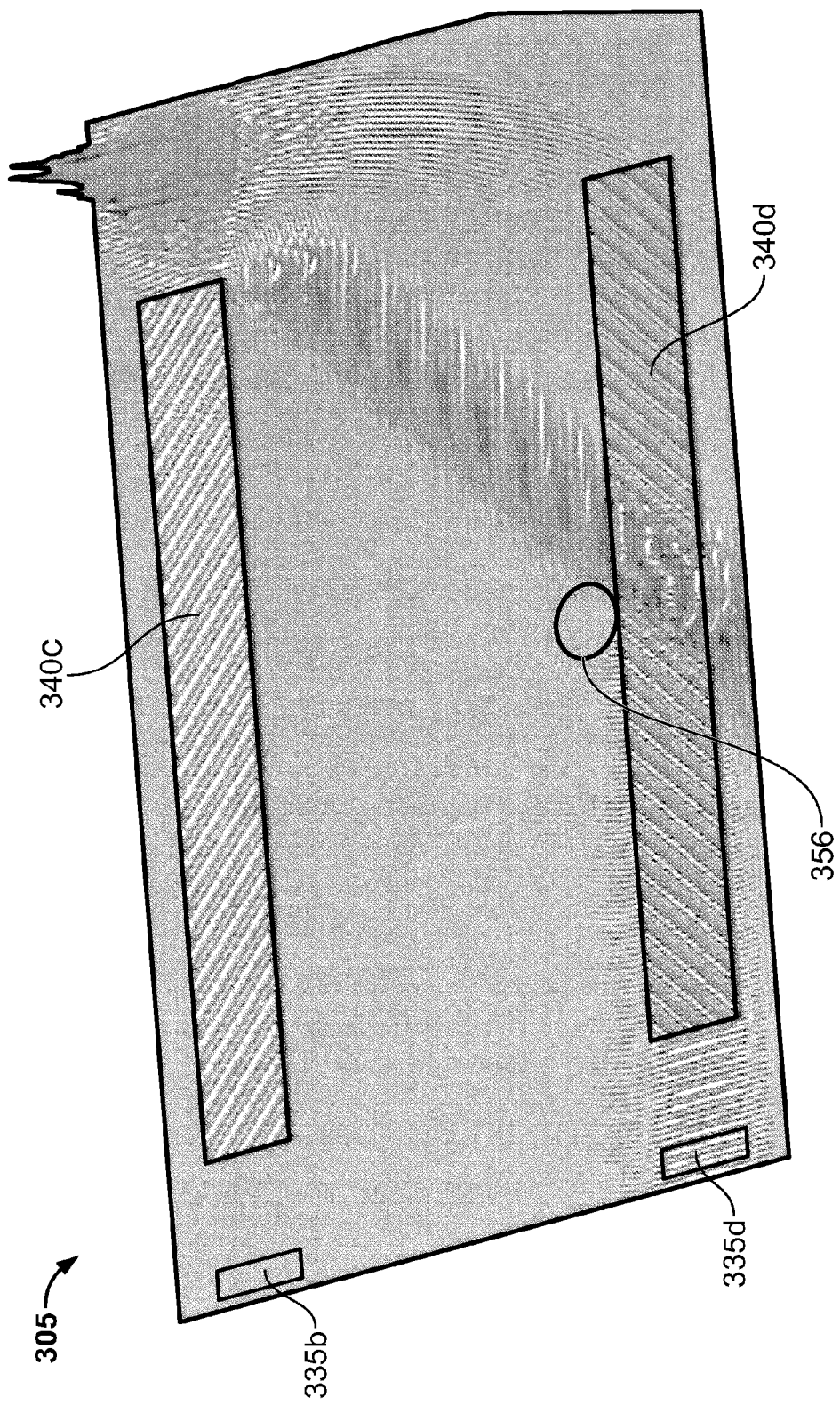
FIG. 8 is a plot of the surface acoustic wave amplitudes on the substrate of FIG. 5 with a circular area of higher acoustic velocity for a first simulation.
Figure 9:
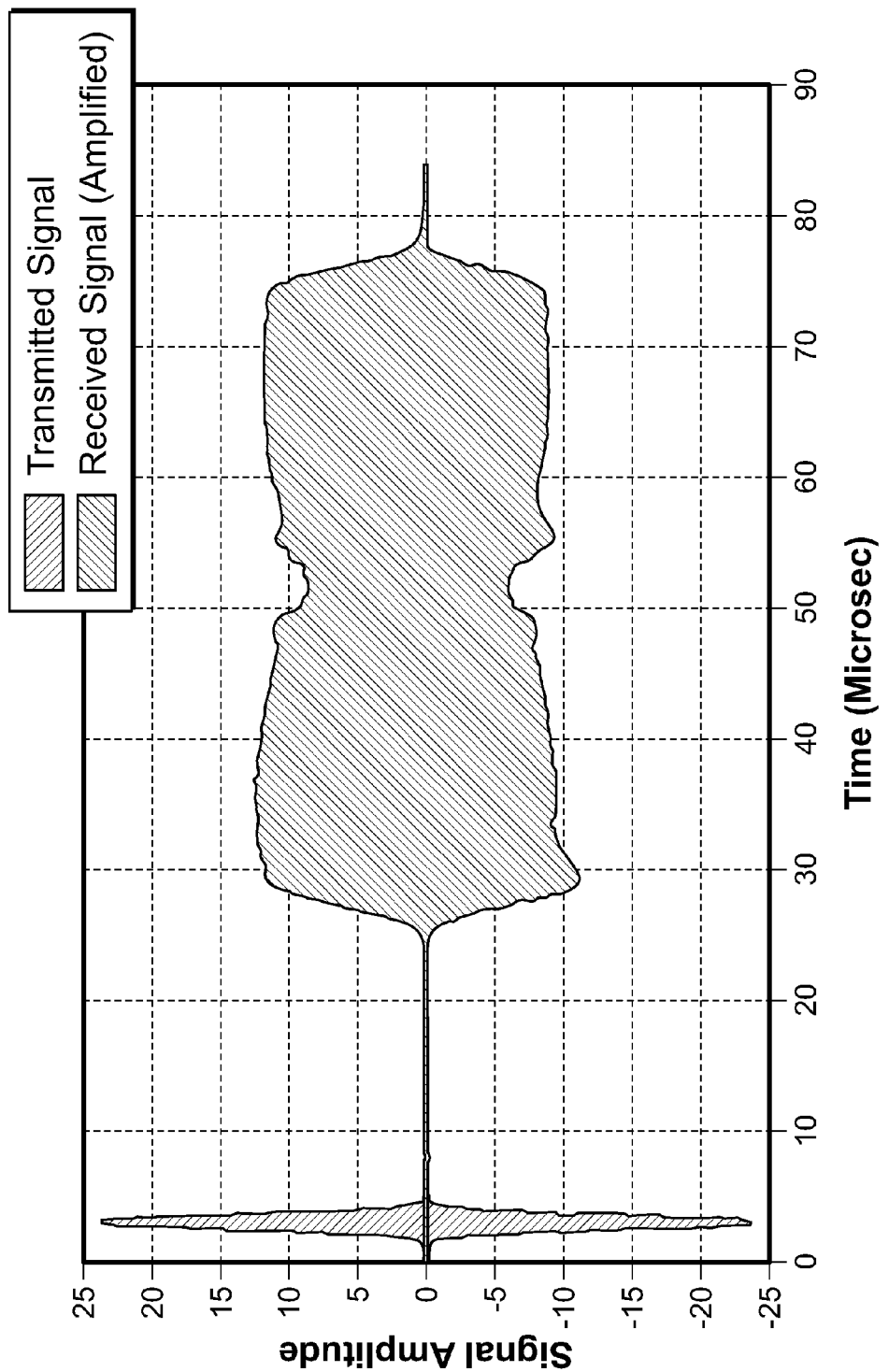
FIG. 9 is a plot of the transmitted and received signals at the transducers for the first simulation of FIG. 8.

FIG. 6 plots the grid amplitudes for a baseline simulation, i.e., no camera hole 356 and no corrective lens 360 are used. As the incident pulse propagates (left to right) from the transmitting transducer 335b through the first reflective array 340c, a portion of the energy is reflected downward—this is standard reflective array behavior. The reflected pulse has a uniform pattern of wave crests indicative of an unperturbed propagation pattern. At this snapshot in time, the downward reflected surface acoustic wave has passed roughly halfway through the second reflective array 340d, and the received acoustic signal (reflected by the second reflective array 340d) can be seen propagating to the receiving transducer 335d in the lower left corner of the substrate 305. FIG. 7 plots the transmitted electrical signal (between 0 and 10 microseconds) and received electrical signal (between 20 and 80 microseconds) at the transducers 335 for the baseline simulation of FIG. 6. The received signal in this plot serves as the baseline comparison for the effects of two different models of the camera hole 356, each with and without the corrective lens 360. Note that the X-axis of the plot represents time measured in microseconds and the Y-axis of the plot represents signal amplitude measured in arbitrary linear units FIG. 8 plots the grid amplitudes for a simulation including a circular camera hole 356 without a corrective lens 360. As compared to the plot of FIG. 6, the apparent phase shifting of the wave crests propagate through the second reflective array 340d directly below the camera hole 356. Note that the phase shifts are actually exaggerated by the steps used to generate the simulation images (e.g., for a camera hole 356 of diameter 6.4 mm, the time phase shift is approximately 57 degrees for a surface acoustic wave passing through the hole 356 center). In particular, the simulation grid is sampled every $7^{th}$ grid point in the amplitude images. This results in a Moire-type exaggeration of periodic patterns within the wave crests. Nevertheless, the plot assists in visualizing the shifting of the wave crests due to the perturbed SAW velocity of propagation due to the camera hole 356. The shift of the wave crests is in the propagation direction due to the increased SAW velocity of propagation within the camera hole 356. FIG. 9 plots the transmitted and received signals for the simulation of FIG. 8 (including the circular camera hole 356 without the corrective lens 360). As compared to the plot of FIG. 7, the plot of FIG. 9 shows a resulting dip in the received signal that is produced by the camera hole 356.

Figure 10:
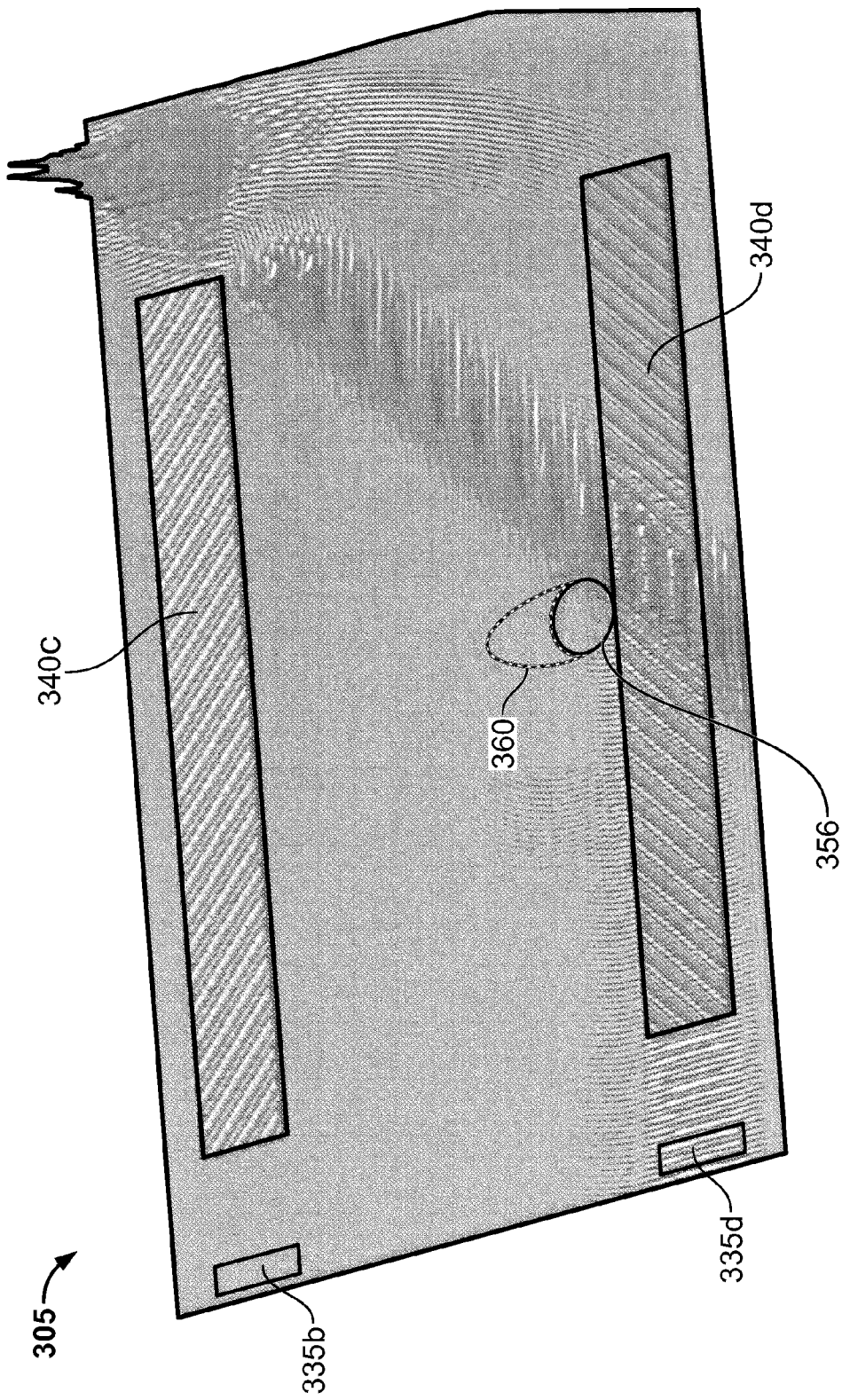
FIG. 10 is a plot of the surface acoustic wave amplitudes on the substrate of FIG. 5 with a circular area of higher acoustic velocity and a corrective lens for a second simulation.
Figure 11:
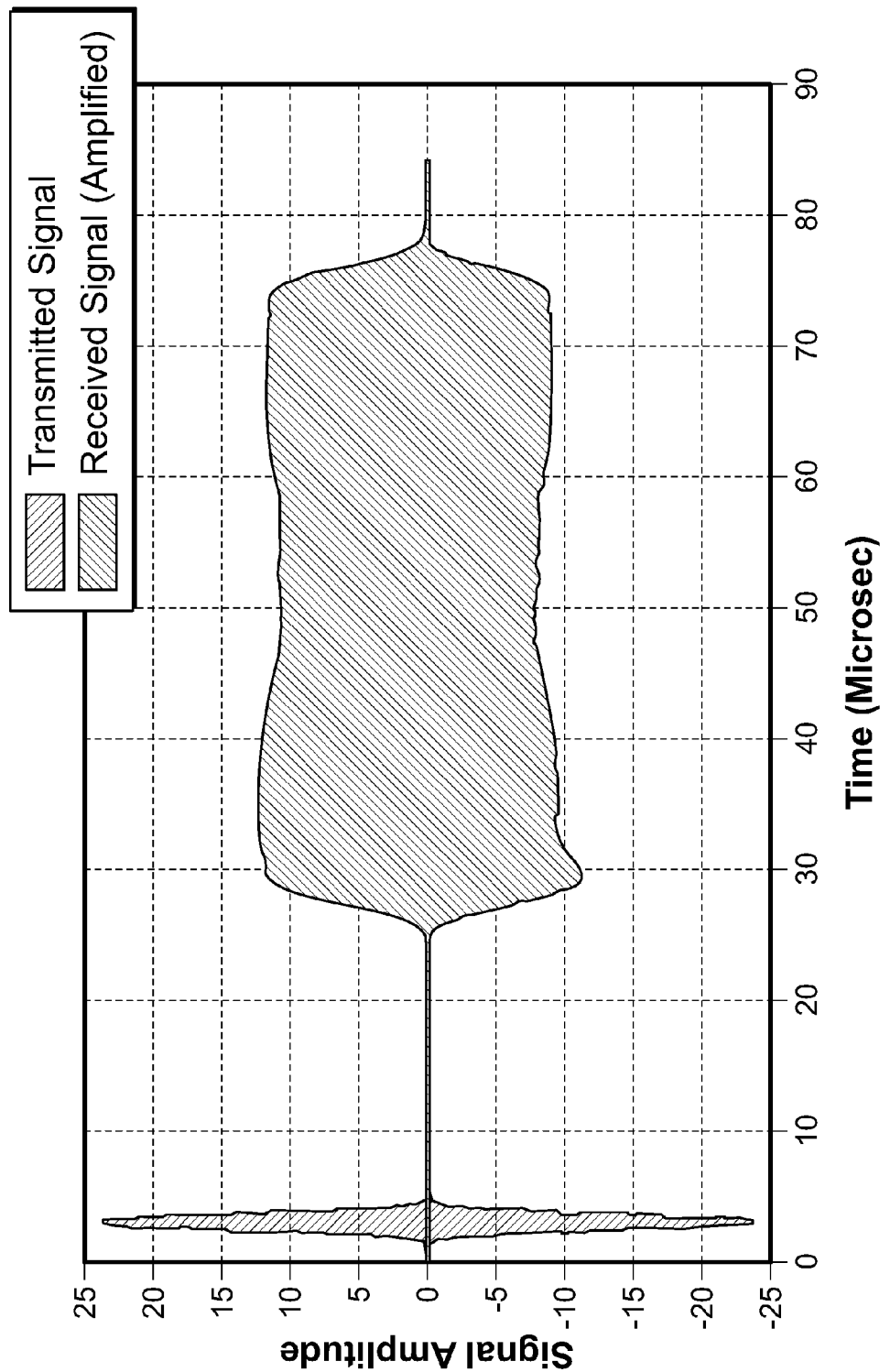
FIG. 11 is a plot of the transmitted and received signals at the transducers for the second simulation of FIG. 10.

FIG. 10 plots the grid amplitudes for a simulation including a circular camera hole 356 with a meniscus-shaped corrective lens 360 alongside the camera hole 356. The lens 360 is positioned on the side of the hole 356 opposite array 340d so as to avoid compromising the function of array 340d. As compared to the plot of FIG. 8, the plot of FIG. 10 shows the phase shift of the wave crests below the camera hole 356 are eliminated. FIG. 11 plots the transmitted and received signals for the simulation of FIG. 10 (including the circular camera hole 356 and the meniscus-shaped corrective lens 360 alongside the camera hole 356). As compared to the plot of FIG. 9, the plot of FIG. 11 shows that the dip in the received signal is eliminated.

Figure 12:
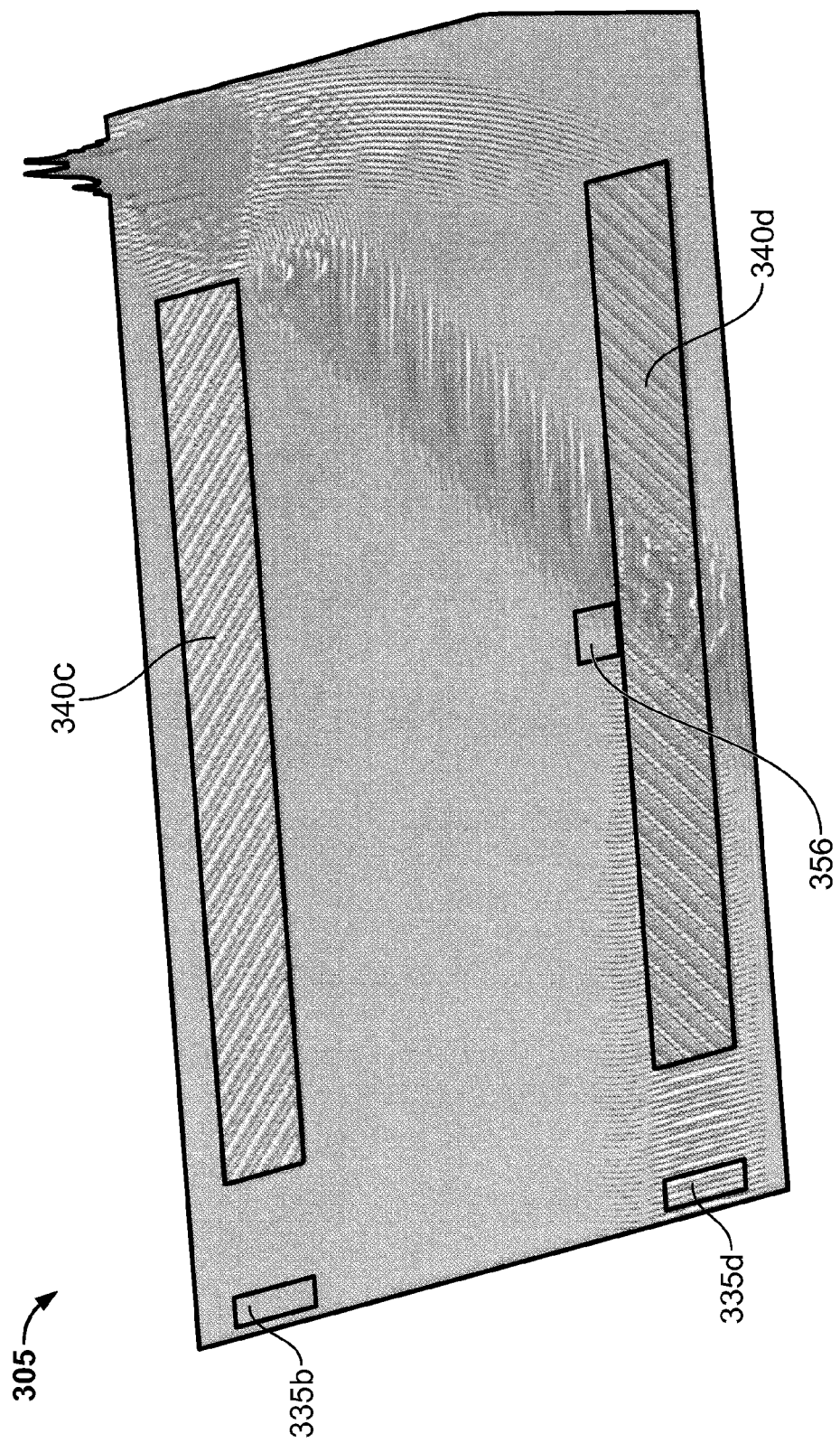
FIG. 12 is a plot of the surface acoustic wave amplitudes on the substrate of FIG. 5 with a rectangular area of higher acoustic velocity for a third simulation.
Figure 13:
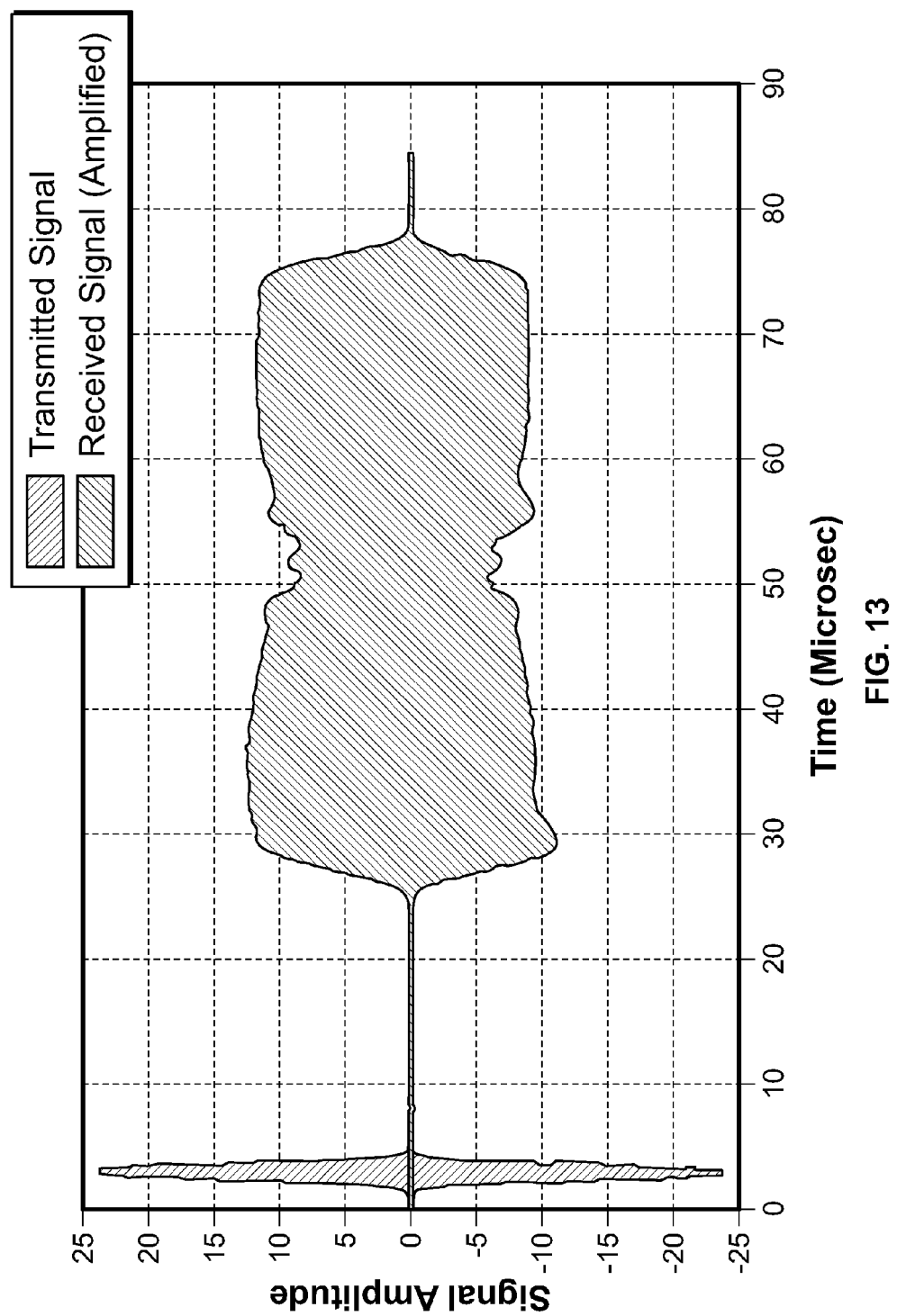
FIG. 13 is a plot of the transmitted and received signals at the transducers for the third simulation of FIG. 12.

FIG. 12 plots the grid amplitudes for a simulation including a rectangular camera hole 356 without a corrective lens 360 (It is noted that rectangular camera holes are typically square). As compared to the plot of FIG. 6, the plot of FIG. 12 shows the apparent phase shifting of the wave crests propagating through the second reflective array 340d directly below the camera hole 356. FIG. 13 plots the transmitted and received signals for the simulation of FIG. 12 (including a rectangular camera hole 356 without a corrective lens 360). As compared to the plot of FIG. 7, the plot of FIG. 13 shows a definite dip in the received signal that is produced by the rectangular camera hole 356.

Figure 14:
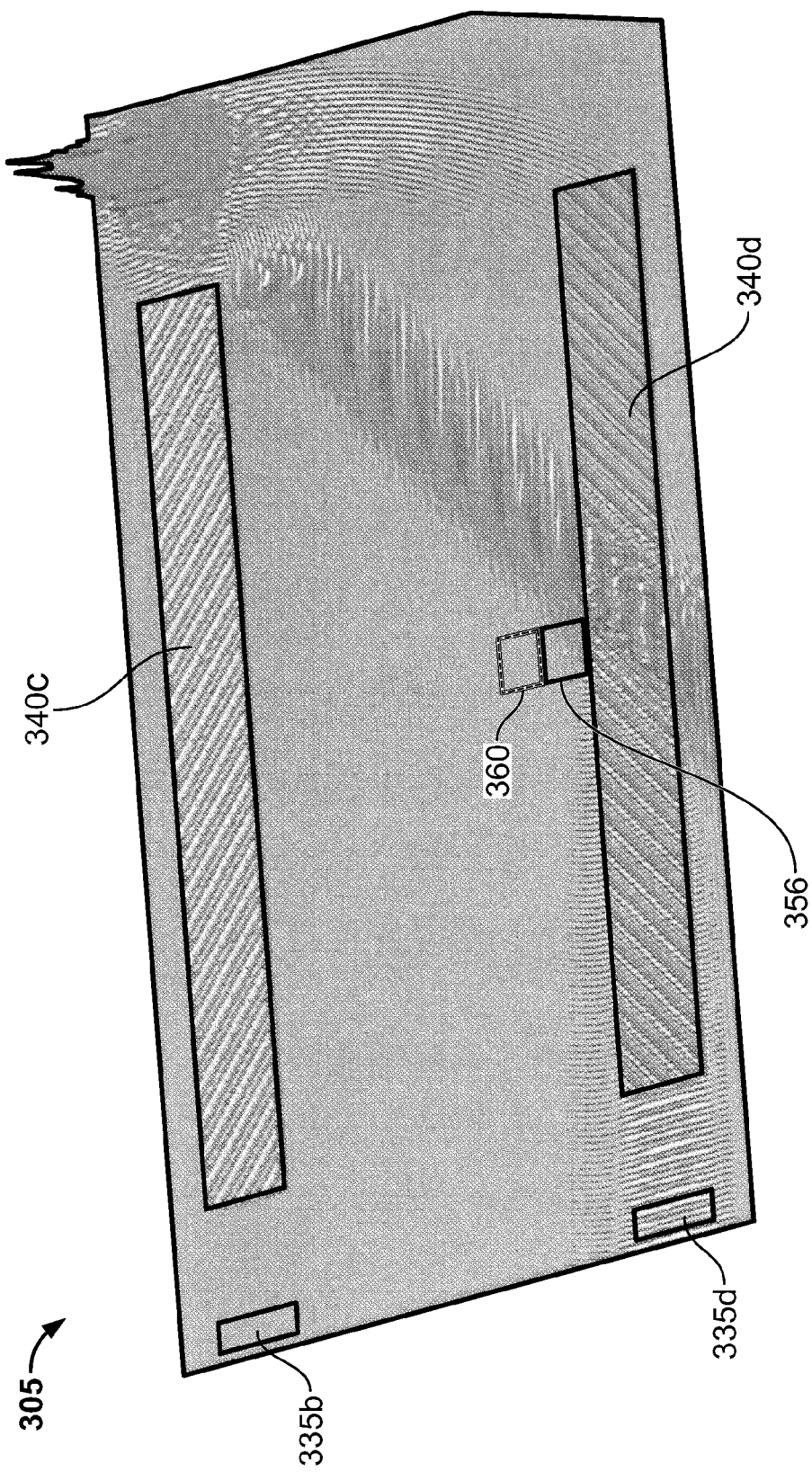
FIG. 14 is a plot of the surface acoustic wave amplitudes on the substrate of FIG. 5 with a rectangular area of higher acoustic velocity and a corrective lens for a fourth simulation.
Figure 15:
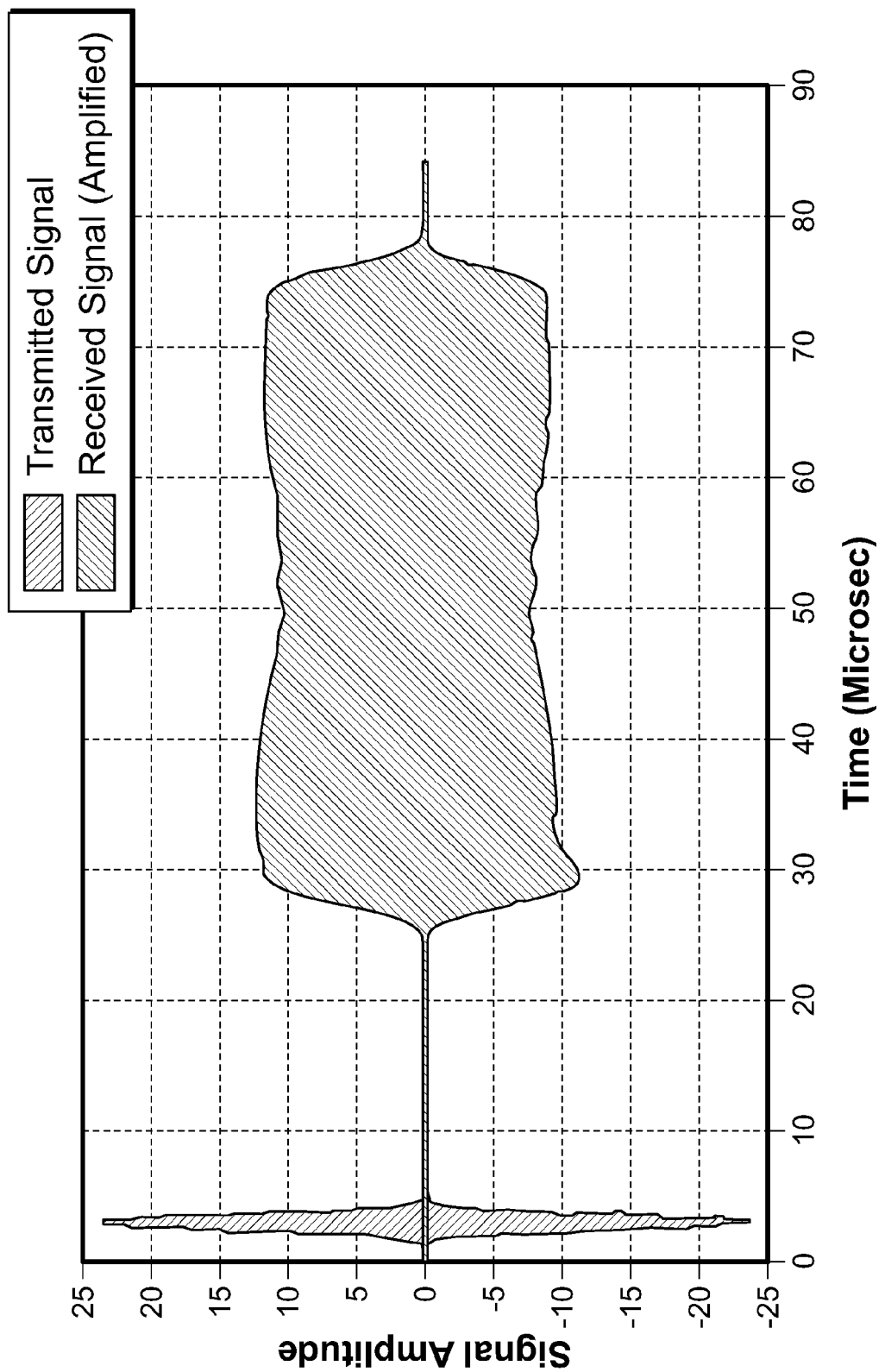
FIG. 15 is a plot of the transmitted and received signals at the transducers for the fourth simulation of FIG. 14.

FIG. 14 plots the grid amplitudes for a simulation including a rectangular camera hole 356 with a rectangular corrective lens 360 (However, it is noted that the corrective lens 360 need not be square in the case the camera hole 356 is square). As compared to the plot of FIG. 12, the phase shift of the wave crests below the camera hole 356 is eliminated. FIG. 15 plots the transmitted and received signals for the simulation of FIG. 14 (including the rectangular camera hole 356 and a rectangular corrective lens 360). As compared to the plot of FIG. 13, the plot of FIG. 15 shows that the dip in the received signal is eliminated.

Several conclusions may be drawn from the above series of computer simulations. First, the simulations confirm that a camera hole 356 may cause dips in the received signals, at least for the simulated magnitudes of the velocity perturbations. Also, the shape of a camera hole 356 appears to be a neutral factor, relative to both the cause of the received signal dips and the resolution provided by the present invention according to a specific embodiment. Also, several different wave propagation behaviors may contribute to the creation of the received signal dips. For the relatively small velocity perturbations simulated, phase shifts were observed in the surface acoustic wavefronts after propagation through a camera hole 356. Therefore, phase shifts appear to be one of the primary mechanisms behind the received signal dips. Phase shifts are the underlying physical basis of refractive effects as well as many diffractive effects. More generally one may say that refractive and diffractive effects contribute to signal variations. Furthermore, the perturbed wavefronts created by the camera hole 356 may interact with the waveguiding characteristics of the reflective arrays 340. In this case, complex propagation patterns could potentially be generated within the second reflective array 340d. Finally, a corrective lens 360 may reduce and/or eliminate the received signal dips caused by the camera hole 356. Note that, in other accompanying simulations, it has been further observed that the strength of the effects on the surface acoustic wave propagation depend upon the magnitude of the assumed ratio of the border layer velocity to the bare glass velocity.

Figure 16:
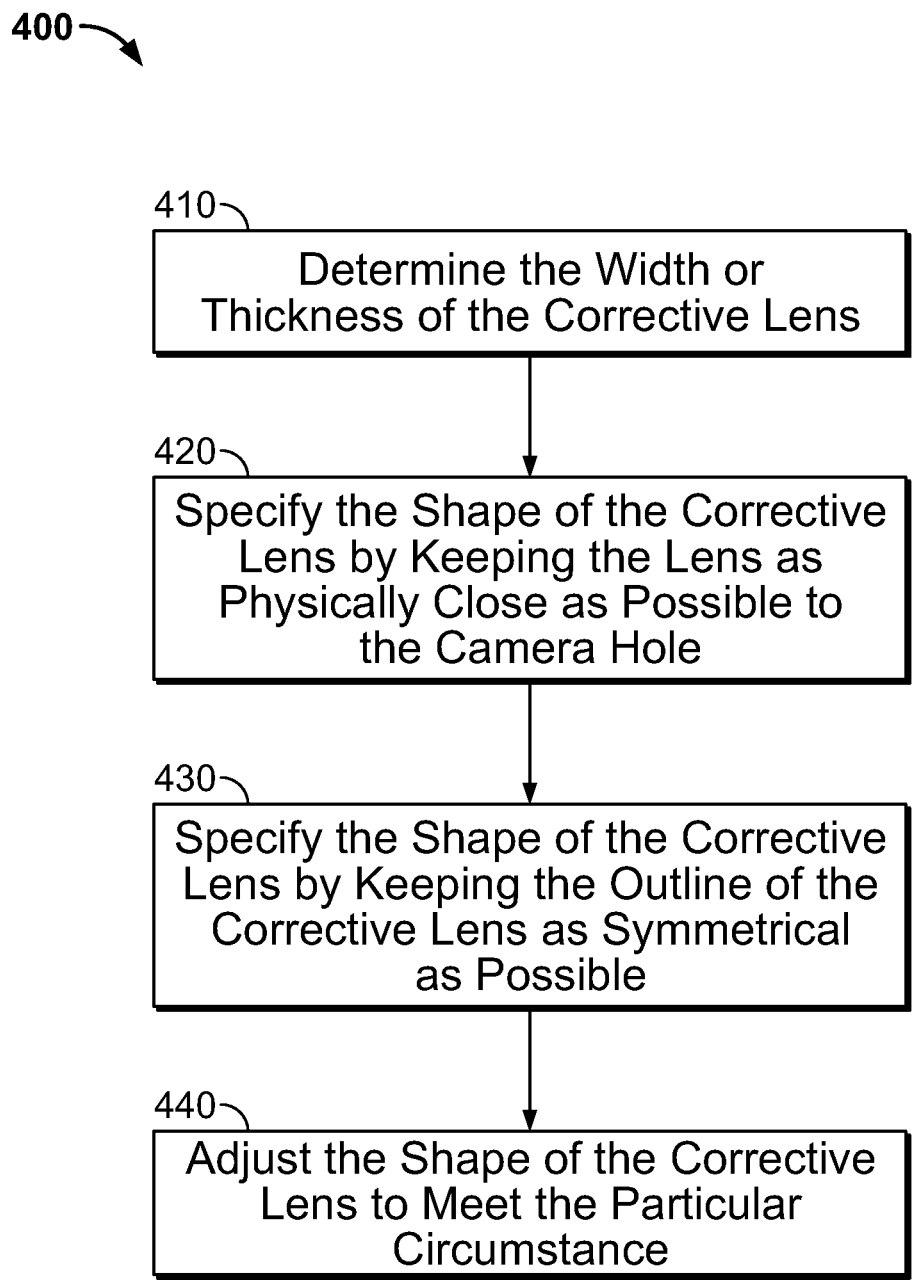
FIG. 16 is a flow diagram of a method for designing a corrective lens carried out in accordance with a specific embodiment of the present invention.
Figure 17:
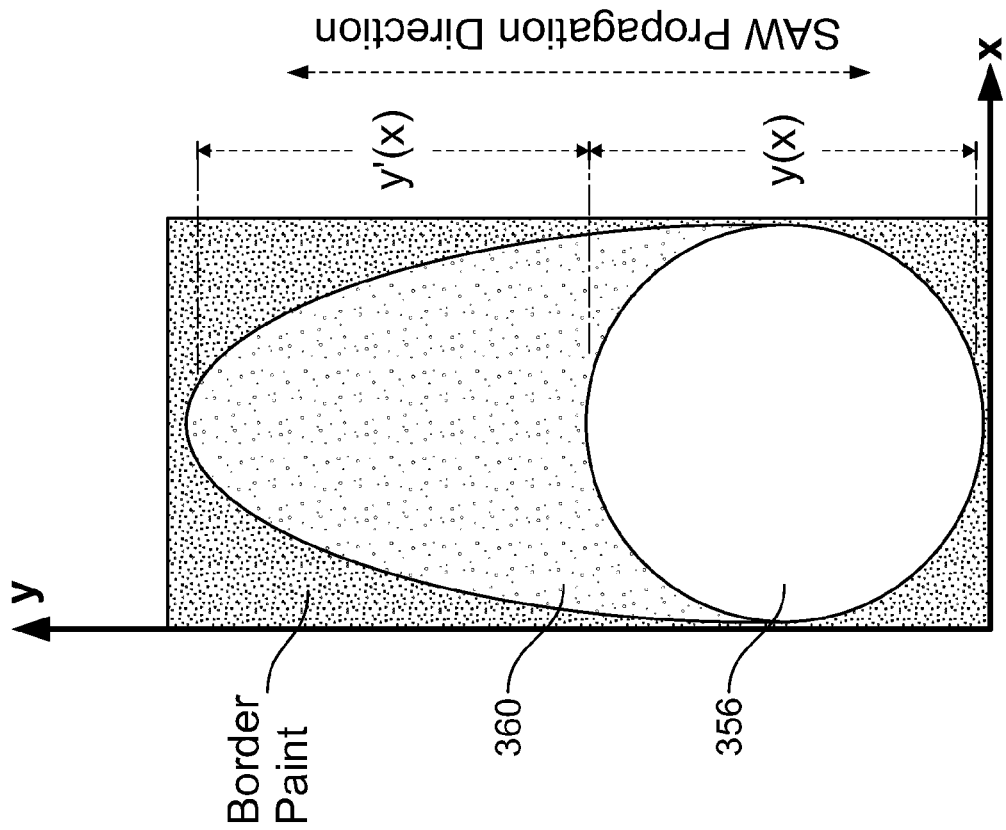
FIG. 17 is an illustration of a corrective lens alongside a camera hole, with reference X-Y coordinate axes, in accordance with a specific embodiment of the present invention.

Each corrective lens 360 used for the above simulations may be designed using a simplified approach 400 based on the cancellation of the phase shifts for all ray paths. FIG. 16 shows a flow diagram of a method 400 to design a corrective lens 360 carried out in accordance with a specific embodiment of the present invention, and FIG. 17 is an illustration of a corrective lens 360 alongside a camera hole 356 in accordance with a specific embodiment, with reference X-Y coordinate axes. It is generally understood that the shape of any correction lens typically depends on the shape of the perturbing lens and on the ratios of the phase velocities (refractive indexes) of the lens materials. However, this by itself does not suggest a method or approach to be used to design the corrective lens 360 for the camera hole 356. Because the shifts in the surface acoustic wave velocity of propagation due to the corrective lens 360 and the border layer are so small (a couple of percent at most), a weak lens approximation applies (in the weak lens approximation, changes in wave propagation direction resulting from phase shifts are sufficiently weak that transverse wave displacement can be neglected in the small region containing the camera hole 356 and corrective lens 360). This suggests an approximate approach to designing the corrective lens 360. In general, the method 400 assumes that all surface acoustic wave paths across the surface 315 of the substrate 305 are straight and adjusts the lens 360 height to cancel the total phase shift along all paths through the camera hole and lens system.

In particular, the method 400 first determines the height of the corrective lens 360 (Step 410). Under the method 400, the velocities of propagation of the surface acoustic waves are defined as follows:

$V_0$=Surface acoustic wave phase velocity in the camera hole 356 (i.e., bare substrate/glass);

$V_1$=Surface acoustic wave phase velocity on the border layer; and $V_2$=Surface acoustic wave phase velocity of the corrective lens 360 printed on the border layer.

On uncoated glass, surface acoustic waves are non-dispersive and there is no distinction between phase and group velocity. However, surface acoustic waves become slightly dispersive for coated glass so it is noted that $V_1$ and $V_2$ herein refer to phase velocities, not group velocities.

The method 400 also assumes, as an example, that a surface acoustic wave is propagating in the Y-axis direction through the camera hole 356 having a dimension y(x) along the Y-axis (or height) and a dimension x along the X-axis (or width), as shown in FIG. 17. The direction of wave propagation determines the direction for the analysis, which in this case is the Y-axis direction since the camera hole 356 is near the top center of the substrate 205. If the camera hole 356 were placed at/near the center of the right side of the substrate 105, the direction for analysis would be the X-axis direction. Note that the shape of the camera hole 356 and its location are assumed to be known (for example, as specified by a customer having a specific camera and camera lens size in mind). Also, for this analysis, the origin of the X axis may be freely chosen for convenience purposes, for example, at the center of the camera hole 356. Similarly, the method 400 assumes that the corrective lens 360 has an unknown height y'(x) along each X-coordinate to be solved.

The surface acoustic phase shift produced by propagation through the camera hole 356 can be written as $$\text{Phase Shift}_{camera\ hole} = (k_0 - k_1) \cdot y(x) = 2\pi f[(1/V_0) - (1/V_1)] \cdot y(x) \quad (3)$$

where wave numbers $k_0 = 2\pi/\lambda_0 = 2\pi f/V_0$; $k_1 = 2\pi/\lambda_1 ' 22\pi f/V_1$; and $k_2 = 2\pi/\lambda_2 = 2\pi f/V_2$ are defined at a fixed frequency f. Likewise, the surface acoustic wave phase shift produced by propagation through the corrective lens 360 can be written as follows:

$$\text{Phase Shift}_{lens} = (k_2 - k_1) \cdot y'(x) = 2\pi f[(1/V_2) - (1/V_1)] \cdot y'(x) \quad (4)$$

In order for the lens 360 to cancel the phase shift of the camera hole 356, $$\text{Phase Shift}_{lens} = -\text{Phase Shift}_{camera\ hole} \quad (5)$$

Plugging Equations 3 and 4 into Equation 5 and canceling the common factor $2\pi f$, the following is obtained:

$$[(1/V_2) - (1/V_1)] \cdot y'(x) = -[(1/V_0) - (1/V_1)] \cdot y(x) \quad (6)$$

Equation 6 can be rearranged to read $$y'(x) = Y_{corr} \cdot y(x) \quad (7)$$

where Ycorr is a constant, dependent only on the surface acoustic wave velocities of propagation defined above:

$$Y_{corr} = (V_2/V_0) \cdot [(V_0 - V_1)/(V_1 - V_2)] \quad (8)$$

Figure 18:
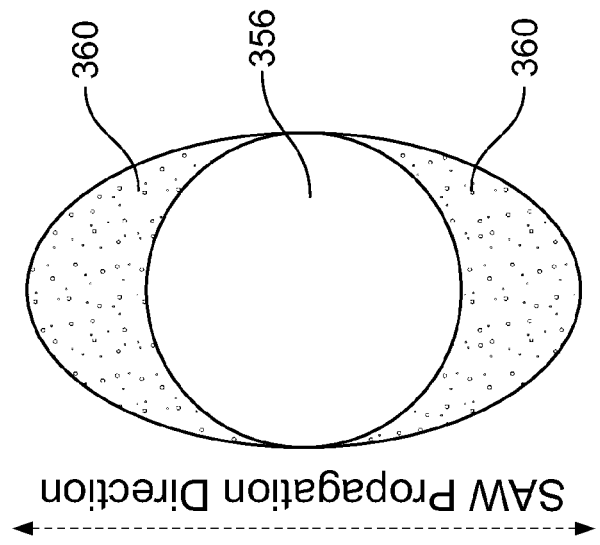
FIG. 18 is an illustration of a corrective lens having a double-sided meniscus shape, in accordance with a specific embodiment of the present invention.

Equations 7 and 8 specify the height of the corrective lens 360 but not the overall shape. The method 400 uses two general guidelines for this purpose. First, the corrective lens 360 should be kept as physically close as possible to the camera hole 356 (Step 420). This will minimize ray scattering (refraction) effects. Second, the outline of the corrective lens 360 should be as symmetrical as possible (Step 430). This can also help to minimize refraction effects. An example of a corrective lens 360 for a circular camera hole 356 that follows both of these guidelines is the two-sided meniscus lens shown in FIG. 18. The result is that the magnitude of the velocity shifts caused by the camera hole 356 and the corrective lens 360 (relative to the surrounding border layer) are approximately equal and opposite in sign. However, for various reasons, it may not be possible to follow both guidelines. In such case, the guidelines may be adjusted to suit the particular circumstance (Step 440). For example, if there is no room on the periphery of the back surface 315 to print a corrective lens 360 on a particular side of the camera hole 356, then a single-sided lens may be used (as shown in FIGS. 10, 14 and 17). This approximates canceling the phase shift of the camera hole 356.

Figure 19:
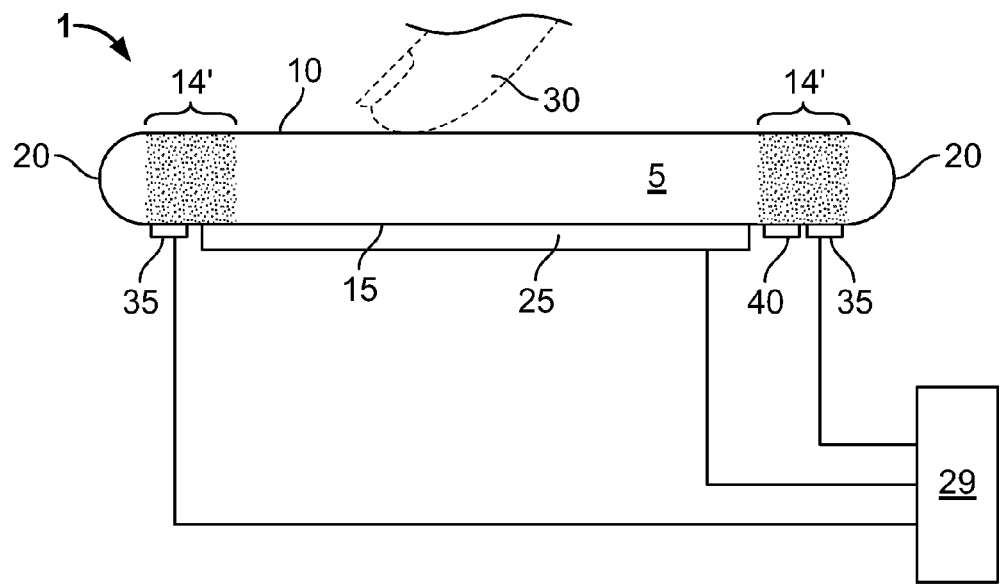
FIG. 19 is a simplified cross-sectional view of an acoustic touch sensor constructed in accordance with an alternative embodiment of the present invention.
Figure 20:
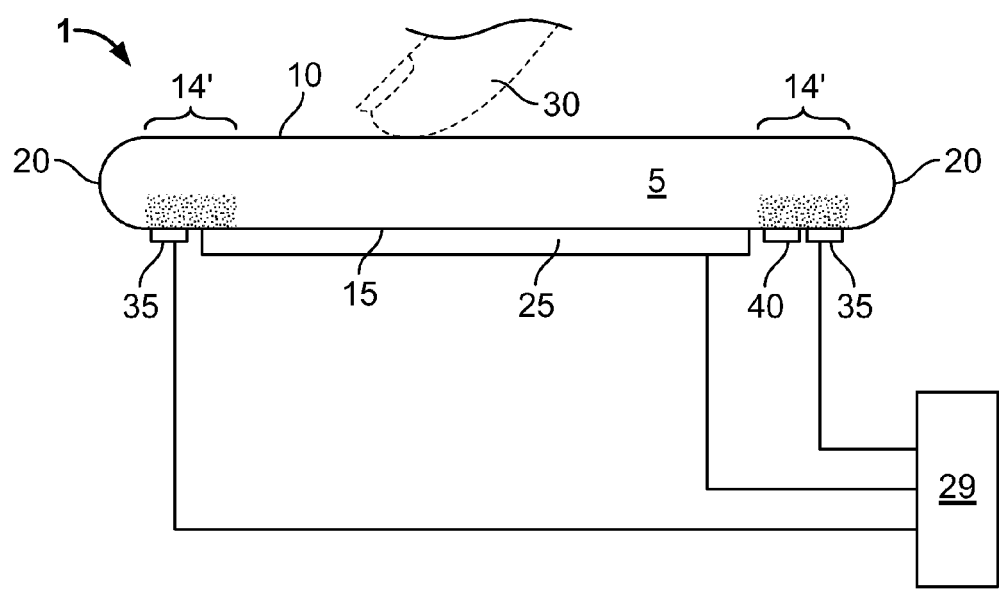
FIG. 20 is a simplified cross-sectional view of an acoustic touch sensor constructed in accordance with another alternative embodiment of the present invention.

Alternative specific embodiments of the present invention that solve the acoustic issues introduced by the camera hole are discussed in conjunction with FIGS. 19 and 20. Note that the elements in FIGS. 19 and 20 that are present in and similar to those in FIG. 1 are not described again. FIGS. 19 and 20 are simplified cross-sectional views of an acoustic touch sensor 1, where the border layer 27 of FIG. 1 is not used but instead the optical properties of the glass substrate 5 are modified so that the border region 14 of the substrate 5 is changed from being transparent to being opaque or colored to provide a "modified border region 14'" of the substrate 5. In some embodiments, coloring or staining the glass in the border region 14' (but not in the camera hole area, not shown) could provide the desired opacity for the modified border region 14' in order to hide the transducers 35 and arrays 40. For example, such glass staining may be possible using ion-exchange coloring of glass, or other glass staining techniques. In another example, electron beaming of glass can observably change the glass from transparent to different shades of brown. A sufficiently dark brown is perceived as black, which is a frequently desired border color. Using low dose electron beaming from about 3 to 8 Mrads, common soda lime glass can be modified to have darker color than similarly electron-beamed borosilicate glass, likely due to the visible band arising from electrons trapped by oxygen vacancies neighboring alkali ions in the glass. The glass material of the substrate 5 may be selected to maximize or optimize the color change for a given electronic beaming dose or stain exposure.

FIG. 19 shows the discoloration of the glass substrate 5 in the modified border region 14' (except for the camera hole area or window) has occurred from the back surface 15 to the front surface 10, assuming that the electron beaming or staining is performed on the back surface 15. Although FIG. 19 shows the discoloration entirely through the thickness of the glass substrate 5 (a more plausible result of electron beaming than for staining), the discoloration may be darker toward the back surface 15 than the front surface 10. To provide sharp boundary definition of the cameral hole, a shallower region of discoloration may be desired. FIG. 20 shows the discoloration of the glass substrate 5 in the modified border region 14' (except for the camera hole area) only partially through the glass substrate 5 and concentrated at the back surface 15, again assuming that the electron beaming or staining is performed on the back surface 15.

Preferably, optical properties of the substrate 5 are modified in a way that has negligible effect on the mechanical properties of the substrate 5, and hence no significant effect on the propagation of surface acoustic waves including leaving the SAW phase velocity essentially unchanged. As a result, no corrective acoustic lens would be required for the camera hole since with no SAW phase velocity change there are no phase shifts to be corrected. In this way, the modified border region 14' obtains a similar result as a corrective lens in preventing signal variations caused by the camera hole.

Other modifications are possible within the scope of the invention. For example, although the steps of the method 400 have been described in a specific sequence, the order of the steps may be re-ordered in part or in whole and the steps may be modified, supplemented, or omitted as appropriate. Also, the method 400 may use various well known algorithms and software applications to implement the steps and substeps. Further, the method 400 may be implemented in a variety of algorithms and software applications. Further, the method 400 may be supplemented by additional steps or techniques.

The invention claimed is:

1. An acoustic touch apparatus, comprising;
a substrate having a first surface and a second surface, the first and second surfaces capable of propagating surface acoustic waves, the second surface comprising a touch region and the first and second surfaces coupled via a rounded connecting surface;
at least one acoustic wave transducer on the first surface; and
at least one reflective array on the first surface, said transducer capable of transmitting or receiving surface acoustic waves to and from said reflective array, said substrate and said reflective array capable of acoustically coupling surface acoustic waves to propagate between the first and second surfaces, and said substrate having a border region on the first surface that is adapted to hide from view through the substrate the transducer and the reflective array and to preclude distortion of surface acoustic waves propagating over a window in the border region via an acoustic lens that counteracts a phase shift of surface acoustic waves propagating over the window, wherein the border region comprises a border layer on the first surface.

2. The apparatus of claim 1, wherein the border region comprises the border layer on the first surface and includes the acoustic lens that counteracts the phase shift of surface acoustic waves propagating over the window, the window being an uncoated area in the border layer.

3. The apparatus of claim 2, wherein the window is an uncoated border area in the border layer on the first surface.

4. The apparatus of claim 3, wherein the acoustic lens has a height that counteracts the phase shift of surface acoustic waves along all propagation paths through the window.

5. The apparatus of claim 3, wherein the acoustic lens is disposed on the border layer to be physically close to the window and have a symmetrical outline relative to the window.

6. The apparatus of claim 3, wherein a height of the acoustic lens is specified by the following:

$$y'(x) = Y\text{corr} \cdot y(x)$$

where $y'(x)$ is the height along an X-coordinate of the acoustic lens perpendicular to direction of propagation of the surface acoustic waves; $y(x)$ is the known height along the X-coordinate; and $Y\text{corr}$ is a constant, dependent, only on the surface acoustic wave velocities of propagation, defined as follows:

$$Y\text{corr} = (V_2/V_0) \cdot [(V_0 - V_1)/(V_1 - V_2)]$$

where $V_0$ is the surface acoustic wave phase velocity in the window; $V_1$ is the surface acoustic wave phase velocity on the border layer except on the window; and $V_2$ is the surface acoustic wave phase velocity of the acoustic lens on the border layer.

7. The apparatus of claim 3, wherein the acoustic lens is a two-sided meniscus shaped lens that at least partially circumscribes the window.

8. The apparatus of claim 3, wherein the acoustic lens is a one-sided meniscus shaped lens that at least partially circumscribes the window.

9. The apparatus of claim 2, wherein the acoustic lens comprises an unobstructed optical path that extends through a border layer on the border region of the substrate from the first surface to the second surface, said acoustic lens and said window disposed adjacent one another on the first surface.

10. The apparatus of claim 9, the acoustic lens is comprised of a material that reduces surface acoustic wave velocity of propagation relative to surface acoustic waves propagating through the window.

11. The apparatus of claim 9, wherein the acoustic lens has a height that counteracts the phase shift of surface acoustic waves along all propagation paths through the window.

12. The apparatus of claim 1, wherein the substrate and the window comprise transparent glass material and the border region excluding the window comprises colored glass material.

13. The apparatus of claim 12, wherein the colored glass material has been colored by a glass staining.

14. The apparatus of claim 12, wherein the colored glass material has been colored by an ion-exchange coloring.

15. The apparatus of claim 12, wherein the colored glass material has been colored by using electron beaming.

16. The apparatus of claim 12, wherein the colored glass material has been colored at least partially through a thickness of the substrate.

17. The apparatus of claim 12, wherein the border region has the same acoustic properties as the touch region on the second surface, the acoustic properties comprising propagating surface acoustic waves, and different optical properties from the touch region, the optical properties of the border region comprising the colored glass material.

18. An acoustic touch apparatus, comprising:
a substrate having a first surface and a second surface, the first and second surfaces capable of propagating surface acoustic waves, the second surface comprising a touch region and the first and second surfaces coupled via a rounded connecting surface;
at least one acoustic wave transducer on the first surface; and
at least one reflective array on the first surface, said transducer capable of transmitting or receiving surface acoustic waves to and from said reflective array, said substrate and said reflective array capable of acoustically coupling surface acoustic waves to propagate between the first and second surfaces, and said substrate having a border region on the first surface, wherein the border region comprises a border layer on the first surface and includes an acoustic lens that counteracts a phase shift of surface acoustic waves propagating over a window, the first surface adapted to hide from view through the substrate the transducer and the reflective array and to preclude distortion of surface acoustic waves propagating over the window in the border region, the window being an uncoated area in the border layer.

19. An acoustic touch apparatus, comprising:
a substrate having a first surface and a second surface, the first and second surfaces capable of propagating surface acoustic waves, the second surface comprising a touch region and the first and second surfaces coupled via a rounded connecting surface;
at least one acoustic wave transducer on the first surface; and
at least one reflective array on the first surface, said transducer capable of transmitting or receiving surface acoustic waves to and from said reflective array, said substrate and said reflective array capable of acoustically coupling surface acoustic waves to propagate between the first and second surfaces, and said substrate having a border region on the first surface that is adapted to hide from view through the substrate the transducer and the reflective array and to preclude distortion of surface acoustic waves propagating over a window in the border region via an acoustic lens that counteracts a phase shift of surface acoustic waves propagating over the window, wherein the border region comprises a border layer on the first surface and wherein the substrate and the window comprise transparent glass material and the border region excluding the window comprises colored glass material.

20. The apparatus of claim 19, wherein the border region has the same acoustic properties as the touch region on the second surface the acoustic properties comprising propagating surface acoustic waves, and different optical properties from the touch region, the optical properties of the border region comprising colored glass material.

\* \* \* \* \*

UNITED STATES PATENT AND TRADEMARK OFFICE
CERTIFICATE OF CORRECTION

| | | |
|---|---|---|
| PATENT NO. | : 8,823,685 B2 | Page 1 of 1 |
| APPLICATION NO. | : 13/274236 | |
| DATED | : September 2, 2014 | |
| INVENTOR(S) | : Scharff et al. | |

It is certified that error appears in the above-identified patent and that said Letters Patent is hereby corrected as shown below:

In the Claims

Column 13,
Line 44, "the acoustic" should read --wherein the acoustic--.

Signed and Sealed this
Tenth Day of February, 2015

Michelle K. Lee
*Deputy Director of the United States Patent and Trademark Office*